United States Patent
Bi et al.

(10) Patent No.: US 12,057,799 B1
(45) Date of Patent: Aug. 6, 2024

(54) SYSTEM AND METHOD FOR STABILIZING FREQUENCY OF THE POWER GRID

(71) Applicant: NORTH CHINA ELECTRIC POWER UNIVERSITY, Beijing (CN)

(72) Inventors: Tianshu Bi, Beijing (CN); Cheng Wang, Beijing (CN); Jiahao Liu, Beijing (CN); Guoyi Xu, Beijing (CN)

(73) Assignee: North China Electric Power University, Beijing (CN)

( * ) Notice: Subject to any disclaimer, the term of this patent is extended or adjusted under 35 U.S.C. 154(b) by 0 days.

(21) Appl. No.: 18/537,489

(22) Filed: Dec. 12, 2023

Related U.S. Application Data

(63) Continuation of application No. 18/222,718, filed on Jul. 17, 2023, now Pat. No. 11,888,432.

(51) Int. Cl.
| | |
|---|---|
| *G05B 15/02* | (2006.01) |
| *F03D 7/02* | (2006.01) |
| *H02P 9/00* | (2006.01) |
| *H02J 3/24* | (2006.01) |

(52) U.S. Cl.
CPC ............ *H02P 9/007* (2013.01); *F03D 7/0284* (2013.01); *G05B 15/02* (2013.01); *F05B 2260/84* (2013.01); *H02J 3/241* (2020.01); *H02J 2300/26* (2020.01)

(58) Field of Classification Search
CPC .... H02J 3/381; H02J 2300/28; H02J 2300/26; H02J 3/24; H02J 3/241; H02J 13/00002; H02J 13/00006; Y02E 10/56; Y02E 10/76; G05F 1/67; G05F 1/66; H03H 7/0115; H03H 1/00; H02P 21/22; H02P 2101/15; F03D 7/00; G05B 15/02; G05B 13/024; G06F 2119/06; G06F 1/305
See application file for complete search history.

(56) References Cited

PUBLICATIONS

Modeling of Wind Turbines Based on Doubly-Fed Induction Generators for Power System Stability Studies Istvan Erlich, Senior Member, IEEE, Jörg Kretschmann, Jens Fortmann, Member, IEEE, (Year: 2007).*

* cited by examiner

*Primary Examiner* — Darrin D Dunn
(74) *Attorney, Agent, or Firm* — Hunton Andrews Kurth LLP

(57) ABSTRACT

A method implemented in a power grid including a DFIG wind turbine is provided. The method includes: assuming the DFIG wind turbine to be operated in a MPPT mode; generating a simplified transient model of the DFIG wind turbine, the simplified transient model including an equivalent circuit model, and an equivalent rotor motion model in a nonlinear form; linearizing the equivalent rotor motion model in the nonlinear form to be an equivalent rotor motion model in a linear form with respect to a steady-state operating point of the DFIG wind turbine; and determining a first contribution and a second contribution of the DFIG wind turbines to a post-disturbance frequency of the power grid, in a center of inertia (COI) frequency frame and in a frequency spatial variation frame, respectively, by incorporating the simplified transient model of the DFIG wind turbine into a frequency dynamics analysis.

1 Claim, 22 Drawing Sheets

SYSTEM AND METHOD FOR STABILIZING FREQUENCY OF THE POWER GRID

FIELD OF THE INVENTION

The present disclosure relates generally to renewable power distribution system, and more particularly, to systems and methods of generating simplified transient model of doubly-fed induction generator (DFIG) wind turbine for power system frequency dynamics analysis.

BACKGROUND

In recent years, the increasing penetration of renewable power generation (RPG) has brought a profound transformation in power system frequency dynamics. Due to the weak inertia characteristic of RPG, the rate of change of frequency (RoCoF) has increased, and the frequency spatial variation has intensified. It is well-known that RPG would have the ability to support frequency with the virtual inertia (VI) control scheme. However, the influence of RPG on system frequency dynamics without frequency-supporting control schemes is still an open question.

SUMMARY

Aspects of the disclosed technology include systems and methods of generating simplified transient model of doubly-fed induction generator (DFIG) wind turbine for power system frequency dynamics analysis.

Embodiments of the present disclosure provide a method of power system frequency dynamics analysis implemented in a power grid including a doubly-fed induction generator (DFIG) wind turbine. The DFIG wind turbine includes a doubly-fed induction machine (DFIM), a wind turbine, and proportional-integral (PI) controllers configured for a maximum power point tracking (MPPT) control module, a phase-locked loop (PLL) module, an active power control loop module, and an reactive power control loop module. The method includes: assuming the DFIG wind turbine to be operated in a MPPT mode; generating a simplified transient model of the DFIG wind turbine, wherein the simplified transient model of the DFIG wind turbine includes an equivalent circuit model, and an equivalent rotor motion model in a nonlinear form; linearizing the equivalent rotor motion model in the nonlinear form to be an equivalent rotor motion model in a linear form with respect to a steady-state operating point of the DFIG wind turbine; and determining a first contribution of the DFIG wind turbines to a post-disturbance frequency of the power grid, in a center of inertia (COI) frequency frame by incorporating the simplified transient model of the DFIG wind turbine into a frequency dynamics analysis; determining a second contribution of the DFIG wind turbines to the post-disturbance frequency of the power grid, in a frequency spatial variation frame by incorporating the simplified transient model of the DFIG wind turbine into the frequency dynamics analysis; and based on the first contribution and the second contribution, adjusting operating point of the DFIG wind turbines through the PI controllers, to stabilize frequency of the power grid, wherein the operating point includes active power, reactive power, terminal voltage, and wind speed.

Further features of the disclosed systems and methods, and the advantages offered thereby, are explained in greater detail hereinafter with reference to specific example embodiments illustrated in the accompanying drawings

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1A:
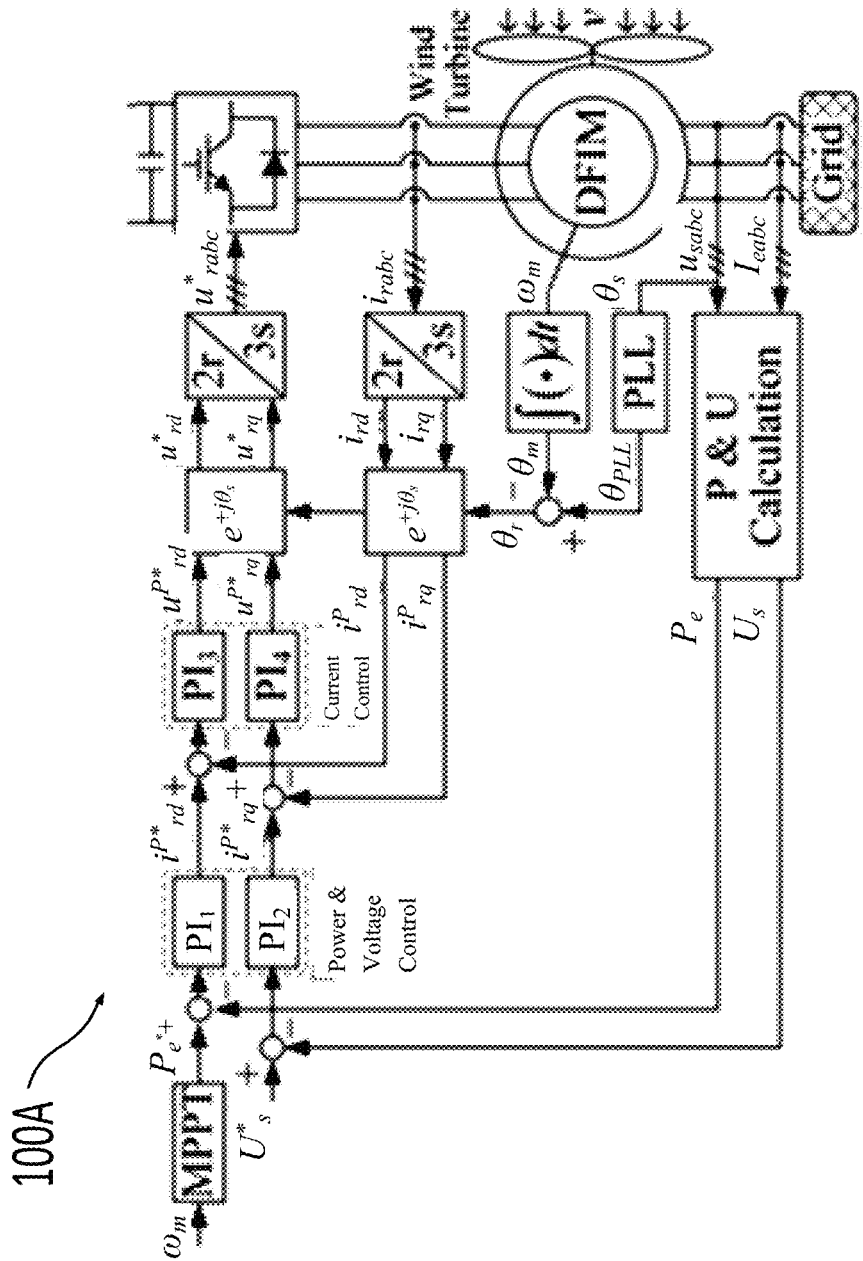
FIG. 1A illustrates a diagram of an example detailed model of a DFIG wind turbine according to an embodiment of the present disclosure.

Exemplary embodiments of the invention will now be described in order to illustrate various features of the invention. The embodiments described herein are not intended to be limiting as to the scope of the invention, but rather are intended to provide examples of the components, use, and operation of the invention. The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

I. INTRODUCTION

Among all types of RPG, the doubly-fed induction generator (DFIG) based wind turbine is recommended for field application and has the most complex dynamics which consists of the induction machine and multiple control loops, especially the stator of the machine directly connecting to the power grid without a converter. Therefore, the DFIG wind turbine can be chosen as a research object of the present disclosure, which could provide a reference for other types of RPGs.

Based on a detailed model of DFIG wind turbine and power system differential-algebraic equations (DAE), the system frequency dynamics can be analyzed by a time-domain simulation method. Nevertheless, it needs to be performed case by case and cannot explain the mechanism of DFIG contributing to the frequency dynamics.

In a power system dominated by synchronized generators, the mechanism of system average frequency dynamics can be revealed under the center of inertia (COI) reference frame, where the network topology is ignored and all the rotor motion equations are aggregated. In particular, solving the system frequency response (SFR) model can quantitatively analyze the influence of system parameters on the post-disturbance maximum RoCoF and frequency nadir. Accordingly, the detailed model of DFIG wind turbine is expected to be simplified and incorporated into the COI frequency analysis frame. In some works, wind turbines under maximum power point tracking (MPPT) and VI control modes are considered as the wind-speed-related power sources and synchronous generators, respectively, which allow the application of the traditional SFR model after mild modifications. Considering the mechanical rotor motion, MPPT control, and other dynamics modules inside DFIG, the VI-controlled DFIG wind turbine can be simplified as tractable transfer functions or equivalent inertia constants. At this time, the DFIG characteristics between the terminal frequency and its active power output can be depicted and added to the SFR model. In fact, the phase-locked loop (PLL), active and reactive control loops of DFIG wind turbine could react to system disturbance in power system frequency dynamics timescale even in the MPPT control mode. By analogy to the synchronous generator, the internal voltage motion of DFIG under the imbalanced active power can be constructed.

Although the above research is beneficial to explain the frequency dynamics mechanism with DFIG penetration under the COI frequency frame, the frequency spatial variation has been more and more remarkable in modern power systems, which requires novel theoretical models of the DFIG. The frequency spatial variation related mechanisms include the synchronous power coefficient (SPC) describing the disturbance power distribution, multi-area SFR model, Frequency Divider used to calculate bus frequency, frequency spatial-temporal characteristics from the wave aspect, and so on. The key point is to combine the system network equations with the synchronous generator circuit equation as well as the rotor motion equation, which constitutes the simplified transient model of the synchronous generator. It should be noted that in the circuit equation, the internal electromotive force (emf) is a state variable that serves as the boundary of the power grid, and the transient reactance reflects the electrical distance between the emf of the power source and the power grid.

Inspired by the frequency spatial variation mechanism analysis works for power systems dominated by synchronized generators, the circuit equation of the DFIG wind turbine should be established, so as to make the frequency dynamics with DFIG interpretable. Unlike the RPG directly connected to the power grid with the voltage source converter (VSC), whose emf is preset, the case for the DFIG wind turbine is much more complicated. In some work, a Thevenin model of the DFIG wind turbine is constructed, and an extended Frequency Divider considering virtual inertia from DFIG is analyzed. In some work, an amplitude-phase model of DFIG wind turbine is constructed, and a two-area SFR model is established. It should be noted that the Thevenin impedance is not only related to the induction machine but also to the DFIG control parameter, which is different from the transient reactance of the synchronous generator. However, the emf defined can be determined by the DFIG rotor current, which is not a state variable. It cannot explain how much disturbance power the DFIG would pick up according to the SPC. In some work, the phase angle of the emf is defined as the PLL phase angle, which meets the definition of the state variable, but the corresponding transient reactance is not given.

The present disclosure aims to derive a simplified transient model of the DFIG wind turbine for power system frequency dynamics analysis. The DFIG wind turbines are assumed to be operated in the MPPT mode, which contains the most complicated dynamics. Other schemes such as VI control can be easily covered.

Specifically, with the high penetration level of renewable power generation, their impacts on the power system frequency dynamics need to be considered, especially the doubly-fed induction generator (DFIG) based wind turbines. By analogy with the synchronous generator, the present disclosure discloses a simplified transient model of DFIG wind turbines, which consists of an equivalent circuit model and an equivalent rotor motion model. It provides a viable and tractable way to analytically quantify the contribution of DFIG wind turbines to the post-disturbance frequency, both in the center of inertia (COI) frequency and frequency spatial variation cases. The unique frequency-supporting features of the DFIG wind turbine will be discussed. The correctness of the disclosed model is verified by simulation results of a weak power system. Compared with the existing works, the salient features of the present disclosure can be threefold.

(1) By analogy with the synchronized generator model adopted in frequency analysis, a simplified transient model of the DFIG wind turbine is established, which contains the equivalent circuit model and equivalent rotor motion model. In the equivalent circuit model, the equivalent emf is constructed by three state variables inside mechanical and control modules, and the corresponding transient reactance is formulated. In the equivalent rotor motion model, the relationship between active power and equivalent rotor motion is characterized as three parts of equivalent inertia and other non-inertia terms.

(2) The disclosed DFIG model is suitable for both the COI frequency dynamics and the frequency spatial variation analysis framework, which cannot be achieved by either the detailed DFIG model or any other simplified DFIG model in the existing works. Meanwhile, the disclosed DFIG model can be extended to the case of a wind farm with multiple DFIG wind turbines. Further, the main differences between DFIG wind turbine and synchronous generator in frequency formation source, inertia characteristics, non-inertia term, and transient reactance are discussed.

(3) Taking a weak power system as an example, the time-varying and adjustable characteristics of the equivalent inertia and equivalent transient reactance are analyzed quantitatively. The integral parameter of PLL and the proportional parameter of the active power control loop have the most significant impacts on the equivalent inertia and equivalent transient reactance, respectively. The mechanical inertia of the DFIG is much smaller than the derived equivalent inertia, which can be ignored in practice.

II. SIMPLIFIED TRANSIENT MODEL OF DFIG WIND TURBINE

A. DEIG Wind Turbine in Frequency Dynamics Timescale

FIG. 1A illustrates a diagram 100A of an example detailed model of a DFIG wind turbine according to an embodiment of the present disclosure. As can be seen, the detailed model of the DFIG wind turbine is complex and high-order. The active power output $P_e$ and terminal voltage $U_s$ are decoupled and controlled via the rotor current $i_{r\{\cdot\}}$ of doubly-fed induction machine (DFIM). Details of the detailed model of the DFIG are presented in Appendix A of the present disclosure. It should be noted that the variables labeled with superscript $\{\cdot\}^*$ and $\{\cdot\}^P$ denote the control reference value and the dq-component is in PLL phase angle reference frame, respectively.

Figure 1B:
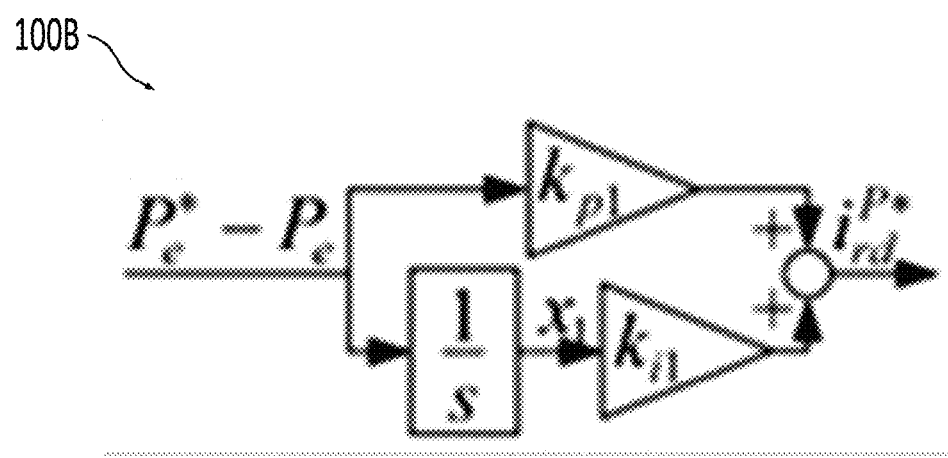
FIG. 1B illustrates a diagram of an example active power control loop that can be included in the detailed model according to an embodiment of the present disclosure.
Figure 1C:
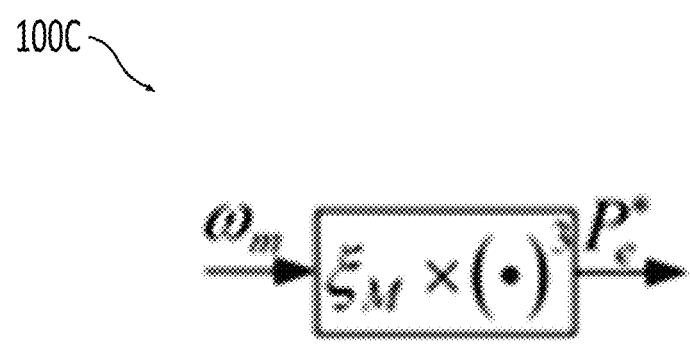
FIG. 1C illustrates a diagram of an example maximum power point tracking (MPPT) control that can be included in the detailed model according to an embodiment of the present disclosure.
Figure 1D:
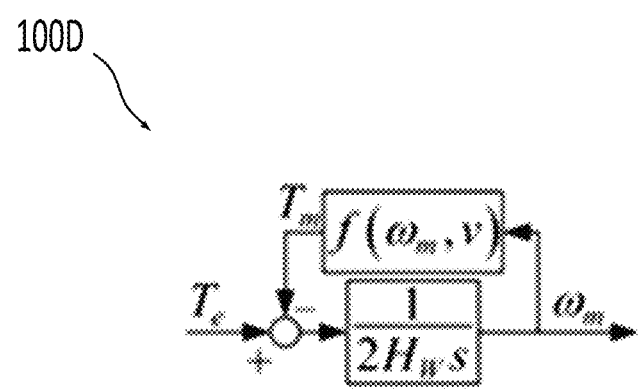
FIG. 1D illustrates a diagram of an example mechanical rotor motion of doubly-fed induction machine (DFIM) and wind turbine and the aerodynamics of wind turbine that can be included in the detailed model according to an embodiment of the present disclosure.
Figure 1E:
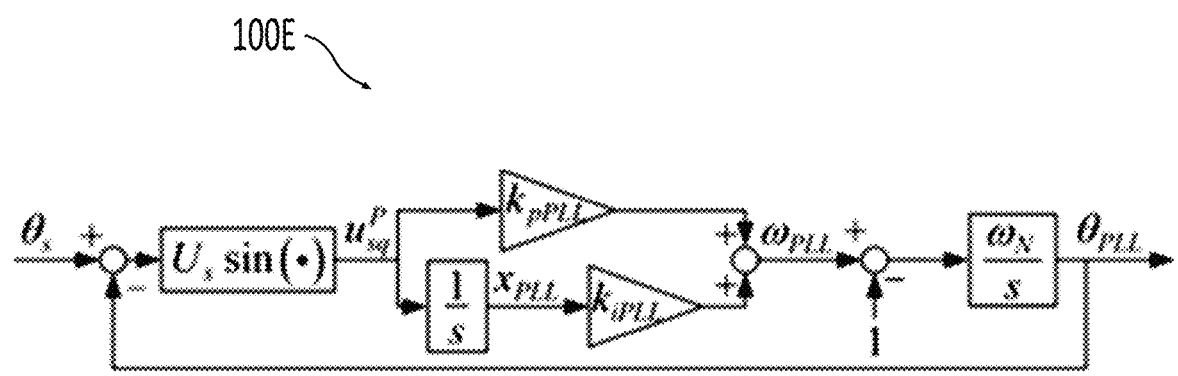
FIG. 1E illustrates a diagram of an example phase-locked loop (PLL) that can be included in the detailed model according to an embodiment of the present disclosure.

The following modules are included in FIG. 1A. There are four control loops with proportional-integral (PI) controllers, i.e., the active power control ($PI_1$) and the terminal voltage control ($PI_2$) of outer loops, the d-axis and the q-axis current controls ($PI_3$ and $PI_4$) of inner loops. Other control modules supporting the control loops include the MPPT control, power, and voltage calculation, and PLL. The primary equipment includes the DFIM and the wind turbine. FIG. 1B illustrates a diagram 100B of an example active power control loop that can be included in the detailed model according to an embodiment of the present disclosure. FIG. 1C illustrates a diagram 100C of an example MPPT control that can be included in the detailed model according to an embodiment of the present disclosure. FIG. 1D illustrates a diagram 100D of an example mechanical rotor motion of DFIM and wind turbine and the aerodynamics of wind turbine that can be included in the detailed model according to an embodiment of the present disclosure. FIG. 1E illustrates a diagram 100E of an example PLL that can be included in the detailed model according to an embodiment of the present disclosure. The diagrams 100B, 100C, 100D, 100E of the active power control loop, the MPPT control, the mechanical rotor motion of DFIM and wind turbine, the aerodynamics of wind turbine, and the PLL, would appear in the disclosed simplified DFIG wind turbine model.

Some prerequisite simplification conditions and assumptions are summarized as follows so as to facilitate the DFIG transient modeling.

A1: The dynamics of grid side converter (GSC) control is ignored because the power output from the DFIM rotor is relatively small and proportional to that of the DFIM stator.

A2: The system disturbance is assumed to be the load active power change, so control modules under voltage disturbance scenarios are not considered.

A3: The pitch control is not considered.

A4: Considering the relatively long timescale of power system frequency dynamics, the electromagnetic transient of the DFIM circuit can also be ignored, which means that the flux satisfies $d\psi_{s\{\cdot\}}/dt=0$.

A5: Dynamics of current control loops with high bandwidth can be ignored, which means that the actual and reference values of rotor current satisfy $$i_{r\{\cdot\}}^P = i_{r\{\cdot\}}^{P*}.$$

A6: The voltage control loop can maintain the terminal voltage constant, i.e., $U_s=U^*_s$ and $$i_{rq}^P = i_{rq0}^P,$$

where the subscript $\{\cdot\}_0$ indicates the steady-state value before disturbance.

B. Inspiration from Generator Simplified Transient Model

Figure 2:
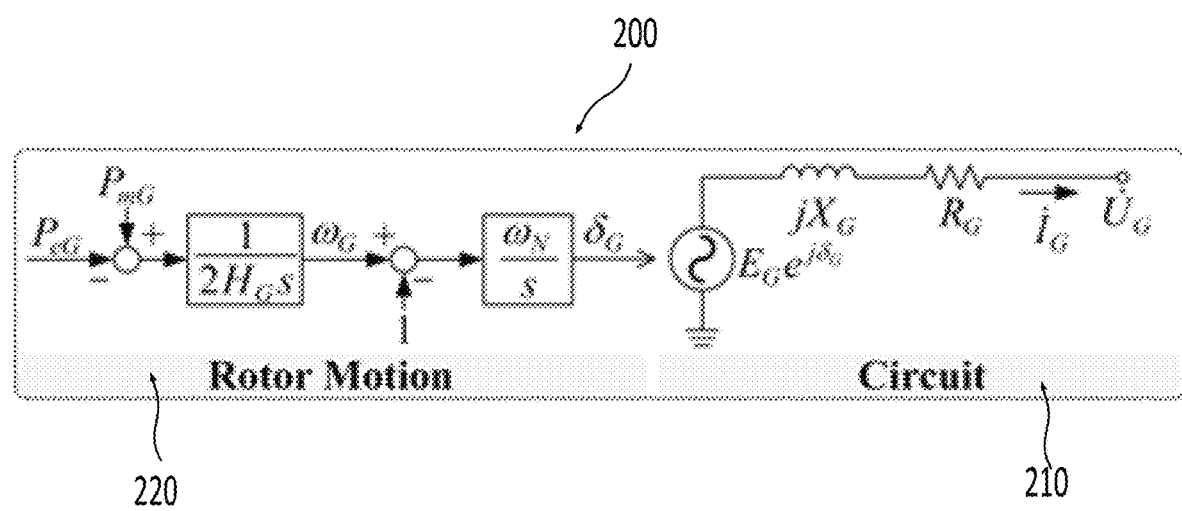
FIG. 2 illustrates a diagram of a simplified transient model of a synchronous generator according to an embodiment of the present disclosure.

In the field of power system frequency dynamics analysis, the simplified transient model of synchronous generator, also known as the Classic Model, is commonly adopted. FIG. 2 illustrates a diagram 200 of a simplified transient model of a synchronous generator according to an embodiment of the present disclosure. As shown in FIG. 2, the simplified transient model can include two parts, i.e., a circuit model 210 and a rotor motion model 220, whose mathematical equations are (1) and (2a) and (2b), respectively.

$$E_G e^{j\delta_G} = \dot{U}_G + j(X_G + R_G)\dot{I}_G, \quad (1)$$

$$2H_G \frac{d\omega_G}{dt} = P_{mG} - P_{eG},$$

$$\frac{d\delta_G}{dt} = \omega_N(\omega_G - 1),$$

Where $\omega_N=2\pi f_N$; $P_{mG}$ and $P_{eG}$ represent the electromagnetic and the mechanical power, respectively.

In the circuit model equation (1), the phase angle $\delta_G$ of emf $E_G e^{j\delta_G}$ determines the active power output of the synchronous generator. It should be noted that $\delta_G$ is a state variable that enables the synchronous generator to perform as a voltage source and actively pick up disturbance power. The transient reactance $X_G$ reflects the electrical distance between the synchronous generator and the power grid. In the rotor motion model equations (2a) and (2b), the mechanical rotor speed $\omega_G$ induces the frequency of emf which further affects the frequency of nearby electrical quantities. The mechanical inertia constant HG determines the rate of change of frequency (RoCoF) under the unbalanced power.

C. Equivalent Circuit Model of DFIG

As pointed out in Section II-B, the emf should be formulated as a state variable. For the DFIG wind turbine, three state variables are included in the dynamic modules which contain integral loops, i.e., the output phase angle $\theta_{PLL}$ of the PLL, the mechanical rotor speed $\omega_m$, and the integral state variable $x_1$ inside the active power control loop. The equivalent emf can be formulated as a combination of the above three state variables, as follows:

$$E_{eg}e^{j\delta_{eq}}=g(\theta_{PLL},\omega_m,x_1), \quad (3)$$

Where the algebraic combination is implicitly expressed by $g(\cdot)$.

According to the assumption A4, the circuit equations of DFIM in dq-axis in the PLL phase angle reference frame can be given as follows:

$$u_{sd}^P=\omega_s X_s i_{sq}^P-\omega_s X_m i_{rq}^P-R_s i_{sd}^P, \quad (4a)$$

$$u_{sq}^P=-\omega_s X_s i_{sd}^P+\omega_s X_m i_{rd}^P-R_s i_{sq}^P, \quad (4b)$$

Where $u_{s\{\cdot\}}$ and $i_{s\{\cdot\}}$ are the terminal voltage and stator current, respectively; $\omega_s$ is the nominal mechanical rotor speed; $X_m$ and $X_s$ are the magnetizing and stator reactances, respectively; $R_s$ is the stator resistance.

Combining (4a) and (4b), the active power control loop, the MPPT control, and assumptions A5 and A6, a relationship between the equivalent emf $u_{s\{\cdot\}}$ and $i_{s\{\cdot\}}$ can be given in equations (5a) and (5b), where the left-hand sides relate to the equivalent emf. Equations (5a) and (5b) represent the equivalent circuit model in dq-axis and need to be reformulated as the form of equation (1).

$$-\omega_s X_m i_{rq0}^P=u_{sd}^P-\omega_s X_s i_{sq}^P+R_s i_{sd}^P, \quad (5a)$$

$$\omega_s X_m(\xi_M k_{p1}\omega_m^3+k_{i1}X_1)=u_{sq}^P+\omega_s X_s i_{sd}^P+R_s i_{sq}^P+\omega_s X_m k_{p1}P_e \quad (5b)$$

Where $k_{p1}$ and $k_{i1}$ are the proportional and integral parameters of the active power control loop, respectively; $\xi_M$ is the MPPT control coefficient.

Since $\omega_s X_m k_{p1}P_e$ only appears in q-axis, equations (5a) and (5b) cannot be reformulated in the phasor form directly, which is unsuitable for the frequency analysis framework. Meanwhile, the existence of $\omega_s X_m k_{p1}P_e$ decreases the similarity of the equations (1) and (5a) and (5b). Hence, an equation related to the DFIM current is constructed as follows:

$$P_s^2+Q_s^2=S_s\times Conj[S_s]=(P_s+jQ_s)Conj[\hat{U}_s^{P*}]\hat{i}_s^P) \quad (6)$$

$$=U_s^*((P_s i_{sd}^P-Q_s i_{sq}^P)+j(P_s i_{sq}^P+Q_s i_{sd}^P)),$$

where $S_s$, $P_s$, and $Q_s$ are the complex power, the active power, and the reactive power of the DFIM stator, respectively; the phase angle of the terminal voltage in the PLL phase angle reference frame is equal to 0, i.e., $\overline{U}_s^{P*}=U_s^*$; Conj[•] represents the conjugate transposed. The imaginary and real parts of the equation (6) are extracted as follows:

$$0=\frac{U_s^*(P_s i_{sq}^P+Q_s i_{sd}^P)}{P_s^2+Q_s^2}, \quad 1=\frac{U_s^*(P_s i_{sd}^P-Q_s i_{sq}^P)}{P_s^2+Q_s^2}. \quad (7)$$

In the equation (7), the constants 0 and 1 are disassembled into the current of dq-axis. Constant 1 can be multiplied by the term $\cdot_s X_m k_{p1}P_e$ and introduced in (5b). Meanwhile, the product of constant 0 and term $\omega_s X_m k_{p1}P_e$ can be supplemented in (5a). In this way, (5a and 5b) can be reformulated as follows:

$$-\omega_s X_m i_{rq0}^P=u_{sd}^P-\omega_s X_s i_{sq}^P+R_s i_{sd}^P-\frac{\omega_s X_m k_{p1}U_s^* P_e}{P_s^2+Q_s^2}(P_s i_{sq}^P+Q_s i_{sd}^P), \quad (8a)$$

$$\omega_s X_m(\xi_M k_{p1}\omega_m^3+k_{i1}x_1)= \quad (8b)$$

$$u_{sq}^P+\omega_s X_s i_{sd}^P+R_s i_{sq}^P+\frac{\omega_s X_m k_{p1}U_s^* P_e}{P_s^2+Q_s^2}(P_s i_{sd}^P-Q_s i_{sq}^P).$$

Figure 3:
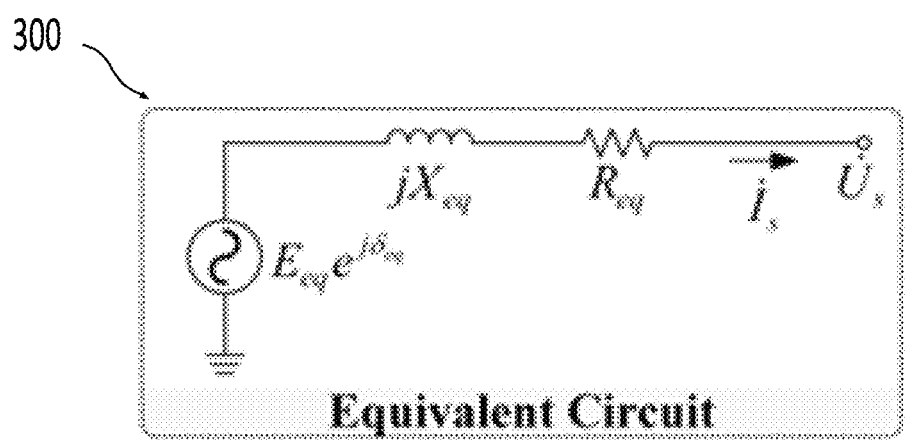
FIG. 3 illustrates a diagram of an equivalent circuit model of a DFIG wind turbine according to an embodiment of the present disclosure.

Now, equations (8a) and (8b) can be written in the phasor form and then transformed into the power grid voltage phase angle reference frame after rotating by the PLL phase angle $\theta_{PLL}$, as shown in (9) and illustrated by FIG. 3. FIG. 3 illustrates a diagram 300 of an equivalent circuit model of the DFIG wind turbine according to an embodiment of the present disclosure.

$$E_{eq}e^{j\delta_{eq}}=\overline{U}_s+(R_{eq}+jX_{eq})\overline{I}_s, \quad (9)$$

Where the equivalent resistance, reactance, amplitude and phase angle of equivalent emf are given in (10a), (10b), (10c) and (10d). In (10a) and (10b), according to the power conversion characteristic of DFIM, the stator power is expressed by the power injected into the power grid, i.e., $P_s=\omega_m P_e$ and $Q_s=Q_e$.

$$R_{eq}=R_s-\frac{\omega_s X_m k_{p1}U_s^*\omega_m^2 P_e Q_e}{P_e^2+\omega_m^2 Q_e^2}, \quad (10a)$$

$$X_{eq}=\omega_s X_s+\frac{\omega_s X_m k_{p1}U_s^*\omega_m P_e^2}{P_e^2+\omega_m^2 Q_e^2}, \quad (10b)$$

$$E_{eq}=\omega_s X_m\sqrt{(\xi_M k_{p1}\omega_m^3+k_{i1}x_1)^2+i_{rq0}^P{}^2}, \quad (10c)$$

$$\delta_{eq}=\theta_{PLL}-\tan^{-1}\left(\frac{\xi_M k_{p1}\omega_m^3+k_{i1}x_1}{i_{rq0}^P}\right). \quad (10d)$$

In order to make the expressions of equivalent resistance $R_{eq}$ and reactance $X_{eq}$ more concise, the variables in (10a) and (10b) can be viewed as constant during disturbance. Among them, $\omega_m$ and $P_e$ can be expressed by steady-state wind speed $v_0$ when satisfying MPPT operation as given in Appendix B, and $Q_e$ is determined by the steady-state power flow, marked as $Q_{e0}$. For example, $X_{eq0}$ can be rewritten as follows:

$$X_{eq}\approx X_{eq0}=\omega_s X_s+\frac{\omega_s \xi_M^2 X_m k_{p1}U_s^* v_0^5}{v_N \xi_M^2 v_0^4+v_N^5 Q_{e0}^2}, \quad (11)$$

Where $v_N$ is the nominal wind speed. In addition, $i_{rg0}^P$ in (10c) and (10d) can be solved and expressed by $Q_{e0}$ and $U^*_s$, as given in Appendix B.

D. Equivalent Rotor Motion Model of DFIG

In analogy to the rotor motion model of the synchronous generator shown in FIG. 2 and equations (2a) and (2b), the equivalent rotor speed of the DFIG wind turbine should be established based on the equivalent emf phase angle (10d). As expressed by equation (12), the partial derivatives of the three state variables are calculated and $\theta_{PLL}$ is replaced by the PLL frequency $\omega_{PLL}$.

$$\omega_{eq} = \frac{1}{\omega_N} \frac{d\delta_{eq}}{dt} + 1$$

$$= \frac{1}{\omega_N} \left( \frac{\partial \delta_{eq}}{\partial \theta_{PLL}} \frac{d\theta_{PLL}}{dt} + \frac{\partial \delta_{eq}}{\partial \omega_m} \frac{d\omega_m}{dt} + \frac{\partial \delta_{eq}}{\partial x_1} \frac{dx_1}{dt} \right) + 1$$

$$= \omega_{PLL} - \frac{3\xi_M k_{p1} \omega_m^2}{\omega_N \left( i_{rq0}^P + \frac{(\xi_M k_{p1} \omega_m^3 + k_{i1} x_1)^2}{i_{rq0}^P} \right)} \frac{d\omega_m}{dt} - \frac{k_{i1}}{\omega_N \left( i_{rq0}^P + \frac{(\xi_M k_{p1} \omega_m^3 + k_{i1} x_1)^2}{i_{rq0}^P} \right)} \frac{dx_1}{dt}.$$

(12)

Figure 4:
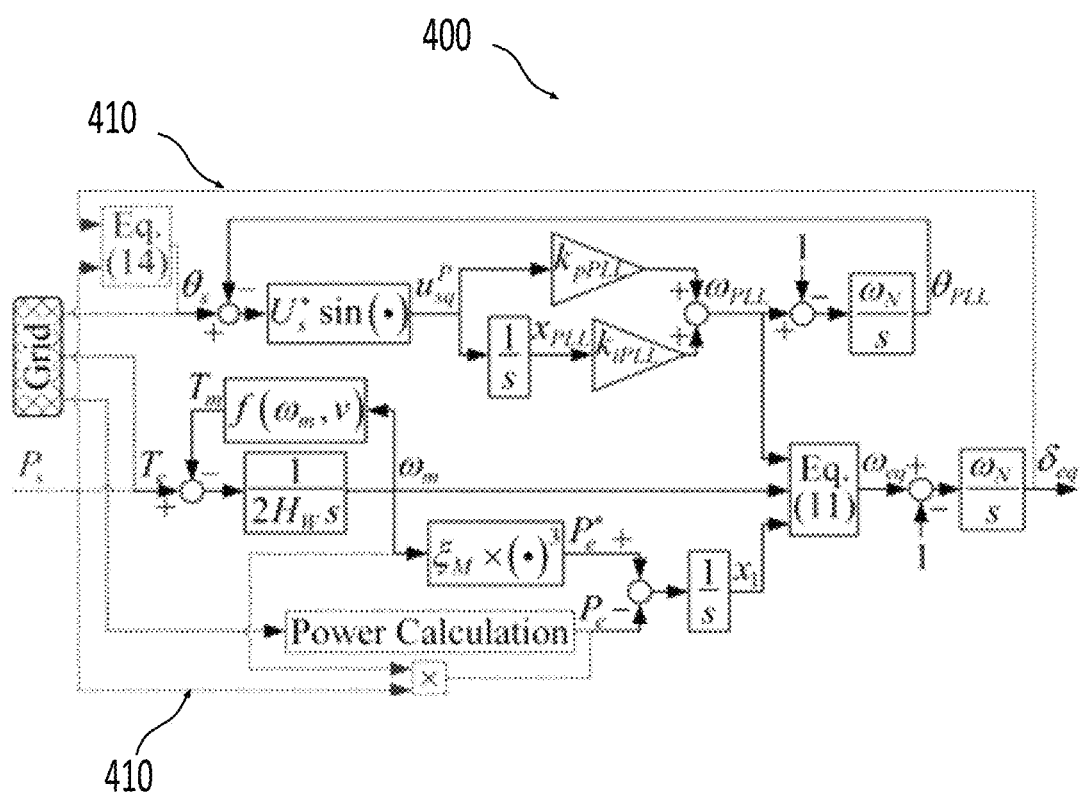
FIG. 4 shows a diagram of an equivalent rotor motion of DFIG wind turbine in nonlinear form according to an embodiment of the present disclosure.

Then, the dynamic modules containing state variables can be combined into a block diagram as shown in FIG. 4, where the equation (12) is represented as the equivalent rotor speed calculation module with input variables $\omega_{PLL}$, $\omega_m$, and $x_1$. FIG. 4 illustrates a diagram 400 of an equivalent rotor motion of DFIG wind turbine in nonlinear form according to an embodiment of the present disclosure. Comparing FIG. 4 with FIG. 2, the input of each module from the power grid should be expressed as the active power $P_s$ measured at emf, as follow.

For the mechanical rotor motion, the electromagnetic torque $T_e$ should be:

$$T_e = -\frac{P_e}{\omega_m} = -P_s.$$

(13)

For the integral control of the active power control loop, $P_e$ from the power calculation module can be replaced by:

$$P_e = \omega_m P_s.$$

(14)

For PLL, the phase angle $\theta_s$ of DFIG terminal voltage can be reflected in the active power flow equation:

$$\theta_s = \delta_{eq} - \sin^{-1}\left( \frac{X_{eq0}}{E_{eq0} U_s^*} P_s \right),$$

(15)

Where $E_{eq0}$ can be found in the equation (10c) and the variables take their steady-state values.

Accordingly, the inputs in FIG. 4 are modified and shown in dashed lines 410. In FIG. 4, the relationship between the active power and the equivalent rotor speed is nonlinear. To obtain the explicit expression of the equivalent rotor motion, linearization with respect to the steady-state operating point is required. First, the equation (12) can be linearized as follows:

$$\Delta\omega_{eq} = \frac{\partial \omega_{eq}}{\partial \omega_{PLL}}\bigg|_0 \Delta\omega_{PLL} + \frac{\partial \omega_{eq}}{\partial \omega_m}\bigg|_0 \Delta\omega_m + \frac{\partial \omega_{eq}}{\partial \frac{d\omega_m}{dt}}\bigg|_0 \frac{d\Delta\omega_m}{dt} +$$

(16)

-continued $$\frac{\partial \omega_{eq}}{\partial x_1}\bigg|_0 \Delta x_1 + \frac{\partial \omega_{eq}}{\partial \frac{dx_1}{dt}}\bigg|_0 \frac{d\Delta x_1}{dt}$$

$$= \Delta\omega_{PLL} + h_{D\omega} \frac{d\Delta\omega_m}{dt} + h_{Dx} \frac{d\Delta x_1}{dt},$$

Where $\partial \omega_{eq}/\partial \omega_m|_0$ and $\partial \omega_{eq}/\partial x_1|_0$ equal to 0 considering $d\omega_m/dt$ and $dx_1/dt$ equal to 0 in steady state; the expressions of linearization coefficients $h_{D\omega}$ and $h_{Dx}$ are given in Appendix B.

Further, the linearization of the other nonlinear modules is given in equations (17a), (17b), (17c), (17d), (17e), including the aerodynamics of wind turbine, the MPPT control, the integral control of the active power control loop, the PLL, and the active power flow equation.

$$\Delta T_m = h_{tm} \Delta\omega_m,$$ (17a)

$$\Delta P_e^* = h_{MPT} \Delta\omega_m,$$ (17b)

$$\Delta P_e = \omega_{m0} \Delta P,$$ (17c)

$$\Delta u_{sq}^P = U_s^* (\Delta\theta_s - \Delta\theta_{PLL}),$$ (17d)

$$\Delta\theta_s = \Delta\delta_{eq} - h_{Pf} \Delta P,$$ (17e)

Where the detail expressions of coefficients $h_{Tm}$, $h_{MPT}$, and $h_{pf}$ are also given in Appendix B.

Figure 5:
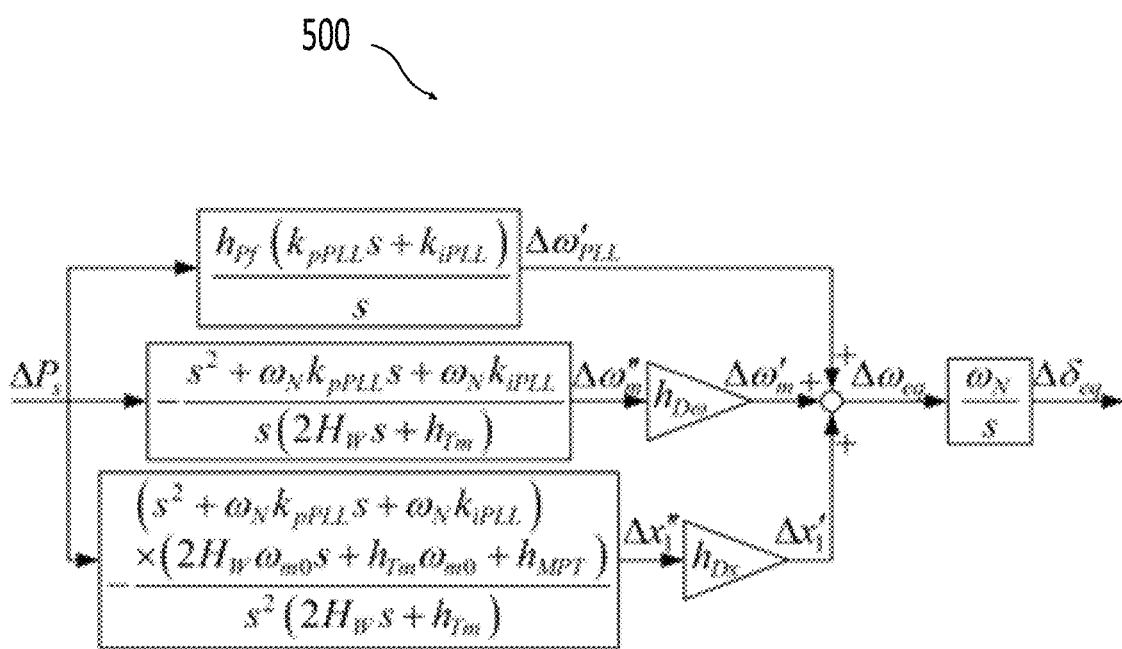
FIG. 5 shows a diagram of an equivalent rotor motion of DFIG wind turbine in linear form according to an embodiment of the present disclosure.

After Laplace transformation and some algebraic operations, the diagram of the equivalent rotor motion can be represented by FIG. 5. FIG. 5 illustrates a diagram 500 of an equivalent rotor motion of DFIG wind turbine in linear form according to an embodiment of the present disclosure. In FIG. 5, the introduced variables $\Delta\omega'_{PLL}$, $\Delta\omega''_m$, and $\Delta x''_1$ correspond to $\Delta\omega_{PLL}$, $d\Delta\omega_m/dt$, and $d\Delta x_1/dt$ in the equation (16). It should be noted that the dynamics of the three state variables shown in the equation (3) are independent and separable.

Figure 6:
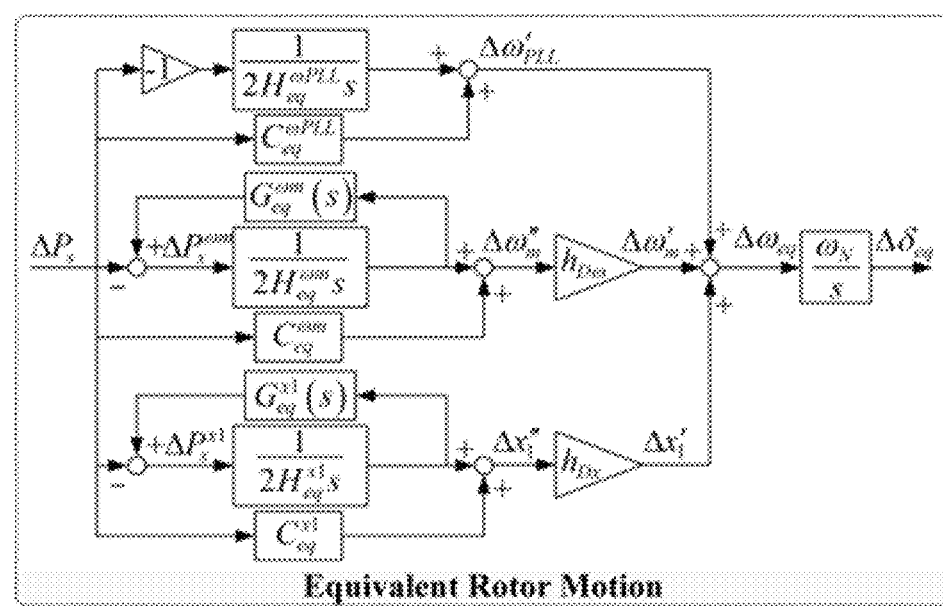
FIG. 6 shows a diagram of an equivalent rotor motion of DFIG wind turbine according to an embodiment of the present disclosure.

FIG. 6 illustrates a diagram 600 of an equivalent rotor motion of DFIG wind turbine according to an embodiment of the present disclosure. To be comparable with the synchronous generator, FIG. 5 needs to be decomposed into FIG. 6, where the equivalent inertia constant $H_{eq}^{\{\cdot\}}$ is defined as follows:

$$H_{eq}^{\omega PLL} = \frac{1}{2h_{Pf}k_{iPLL}},$$ (18a)

-continued $$H_{eq}^{\omega m} = \frac{2H_W^2}{2\omega_N H_W k_{pPLL} - h_{Tm}}, \quad (18b)$$

$$H_{eq}^{x1} = \frac{H_W}{h_{MPT} + 2\omega_N H_W k_{pPLL}\omega_{m0}}. \quad (18c)$$

In addition to equivalent inertia terms, the constant term $C_{eq}^{\{\cdot\}}$ and transfer function $G_{eq}^{\{\cdot\}}(s)$ are also included in the equivalent rotor motion model, so as to reflect the high-order feature of the original DFIG model. Their expressions are given in equations (19a), (19b), (19c) and (20a) and 20(b), respectively.

$$C_{eq}^{\omega PLL} = -h_{pf} k_{pPLL}, \quad (19a)$$

$$C_{eq}^{\omega m} = -\frac{1}{2H_W}, \quad (19b)$$

$$C_{eq}^{x1} = -\omega_{m0}. \quad (19c)$$

$$G_{eq}^{\omega m}(s) = \frac{2(h_{Tm}^2 H_W + 4\omega_N H_W^3 k_{iPLL} - 2h_{Tm}\omega_N H_W^2 k_{pPLL})s}{(h_{Tm} - 2\omega_N H_W k_{pPLL})^2 s - 2\omega_N H_W (h_{Tm} k_{iPLL} - 2H_W k_{pPLL})} \quad (19d)$$

$$G_{eq}^{x1}(s) = \frac{(-h_{MPT}h_{Tm} + 2h_{MPT}\omega_N H_W k_{pPLL} + 4\omega_N H_W^2 k_{pPLL}\omega_{m0})s^2 + 2\omega_N H_W k_{pPLL}(h_{MPT} + h_{Tm}\omega_{m0})s}{(h_{MPT} + 2\omega_N H_W k_{pPLL}\omega_{m0})^2 s^2 + (h_{MPT} + 2\omega_N H_W k_{pPLL}\omega_{m0})(h_{MPT}\omega_N k_{pPLL} + 2\omega_N H_W k_{pPLL}\omega_{m0} + h_{Tm}\omega_N k_{pPLL}\omega_{m0})s + \omega_N k_{iPLL}(h_{MPT} + h_{Tm}\omega_{m0})(h_{MPT} + 2\omega_N H_W k_{pPLL}\omega_{m0})} \quad (20b)$$

It should be noted that the variables related to the steady-state operating point can be expressed by $v_0$, $Q_{e0}$, and $U^*_s$, just like the parameters in the equivalent circuit model.

E. Comparison With the Detailed Model

The comparison of the disclosed simplified transient model and the detailed model is summarized in Table I. First, in terms of the modeled dynamics, all dynamic modules in FIG. 1 are considered in the detailed model. In contrast, only the PLL, mechanical rotor motion, and active power control loop are considered in the simplified transient model. In terms of the model form, the detailed model is formulated by a set of DAEs as given in Appendix A. The DAE set contains all state variables inside the primary equipment and control modules, and the inherent parameters used to describe module characteristics are retained. The simplified transient model is formulated by the equivalent circuit and rotor motion models, as deduced in Section II-C and II-D. The equivalent emf serves as the state variable and is constituted by the three state variables in the frequency dynamics timescale. The inherent parameters that affect the DFIG dynamics in the frequency timescale, such as the PLL control parameters, active power control parameters, DFIM reactance, and mechanical inertia, are reconstructed as equivalent reactance and inertia. The DFIG operating points, i.e., wind speed, reactive power output, and terminal voltage, are also included in the equivalent parameters. The simplified transient model can be applied to analytically analyze power system frequency dynamics along with the simplified transient model of synchronized generators.

TABLE I

COMPARISON OF THE DETAILED MODEL AND THE PROPOSED MODEL

| Aspects | Detailed model | Proposed model |
|---|---|---|
| Dynamic modules | All | Dynamic modules in frequency dynamics timescale |
| Model form | Equation Full-order DAE | Equivalent circuit and rotor motion |
| | State variable All | Equivalent emf constituted by three state variables |
| | Parameter Module inherent parameters | Equivalent transient reactance and inertia |
| System-level application | Simulation | Frequency dynamics analytical analysis |

For a DFIG wind farm, the simplified transient model of all DFIG wind turbines can be aggregated to one simplified transient model for the DFIG wind farm, e.g., summing the equivalent inertia and parallel connecting the equivalent transient reactance of each DFIG turbine. It should be noted that the aggregation will not be affected by the inconsistency in the control parameters and operating points of each DFIG wind turbine, since the form of the simplified transient model is fixed. In addition, if the inconsistency of each DFIG wind turbine is non-negligible and the dynamics of emfs are significantly different, the wind farm should be clustered as small ones, and each DFIG cluster could be aggregated by one simplified transient model.

III. ROLE OF DFIG WIND TURBINE IN POST-DISTURBANCE FREQUENCY DYNAMICS

A. The COI Frequency Frame

Since the simplified transient model of DFIG wind turbine has a similar form with the synchronous generator, it can be easily incorporated into the frequency dynamics analysis in the COI reference frame. The COI frequency $\Delta\omega_{COI}$ is expressed as equation (21a), and the system COI inertia $H_{COI}$ can be described by equation (21b). From the equations (21a) and (21b), the equivalent rotor speed and the equivalent inertia of the DFIG wind turbine would contribute to the COI frequency and the COI inertia.

$$\Delta\omega_{COI} = \frac{\sum_{\forall g} H_{G,g} S_{N,g} \Delta\omega_{G,g} + \sum_{\forall w} H_{eq,w}^{tol} S_{N,w} \Delta\omega_{eq,w}}{\sum_{\forall g} H_{G,g} S_{N,g} + \sum_{\forall w} H_{eq,w}^{tol} S_{N,w}}, \quad (21a)$$

$$H_{COI} = \frac{\sum_{\forall g} H_{G,g} S_{N,g} + \sum_{\forall w} H_{eq,w}^{tol} S_{N,w}}{\sum_{\forall g} S_{N,g} + \sum_{\forall w} S_{N,w}}, \quad (21b)$$

Where g and w represent the index of the synchronous generator and the DFIG wind turbine, respectively; $S_N$ is the generator nominal capacity; $H_{eq}^{tol}$ is the total equivalent inertia of the DFIG wind turbine, which would be interpreted later.

However, the mechanism of the DFIG wind turbine participating in COI frequency dynamics is different from the synchronous generator, which can be summarized in the following three aspects.

1) Source of Frequency: For the synchronous generator, the emf frequency is determined by the mechanical rotor speed, whose dynamics is determined by the mechanical rotor motion. For the DFIG wind turbine, since three state variables in the frequency dynamic timescale are included, the equivalent rotor speed consists of three components that jointly determine the equivalent emf frequency. From FIG. 6, their dynamics are determined by different modules as summarized in Table II. It should be noted that the influences of three variables on the equivalent rotor speed are different, which can be reflected by the linearization coefficients $h_{D\omega}$ and $h_{Dx}$.

TABLE II

VARIABLES CONSTITUTING EQUIVALENT ROTOR SPEED
AND MODULES DETERMINING THEIR DYNAMICS

| Variable | Related module |
|---|---|
| $\Delta\omega'_{PLL}$ | PLL |
| $\Delta\omega''_m$ | PLL, mechanical rotor motion, and aerodynamics of wind turbine |
| $\Delta x''_1$ | PLL, mechanical rotor motion, aerodynamics of wind turbine, MPPT, and integral control of active power control loop |

2) Inertia Characteristics: For the synchronous generator, its mechanical rotor speed dynamics is dominated by the mechanical inertia constant. As shown in FIG. 6, the change rates of three rotor speed components are mitigated by three equivalent inertia terms, respectively. Since the equivalent rotor speed is the weighted sum of three components, the total equivalent inertia is the superposition of three equivalent inertia constants in a parallel connection way, as given in equation (22). It should be noted that the energy source is still the kinetic energy of the DFIG mechanical rotor.

$$H_{eq}^{tol} = \frac{1}{\frac{1}{H_{eq}^{\omega PLL}} + \frac{1}{H_{eq}^{\omega m'}} + \frac{1}{H_{eq}^{x1'}}}, \quad (22)$$

Where $H_{eq}^{\omega m'} = h_{D\omega}/H_{eq}^{\omega m}$ and $H_{eq}^{x1'} = h_{Dx}/H_{eq}^{x1}$ are the inertia normalized by the coefficient $h_{D\omega}$ and $h_{Dx}$, respectively.

Since all the linearization coefficients $h_{\{\cdot\}}$ in (16) and (18a), (18b), (18c) are related to wind speed $v_0$, reactive power $Q_{e0}$, and terminal voltage $U^*_s$, the equivalent inertia of DFIG is determined by the system operating point and time-varying. In addition, the equivalent inertia is also determined by the control parameters and can be adjusted manually. For example, decreasing the PLL integral control parameter $k_{iPLL}$ can increase the equivalent inertia for variable $\Delta\omega''_{PLL}$, as described in (18a).

3) Non-inertia Term: In addition to the equivalent inertia, the high-order components in the dynamics of variables $\Delta\omega''_m$ and $\Delta x''_1$ are decomposed as transfer functions $G_{eq}^{\omega m}(s)$ and $G_{eq}^{x1}(s)$, respectively. These terms change the unbalanced power driving the equivalent rotor speed in a relatively long timescale, i.e., $\Delta P_s^{\omega m}$ and $\Delta P_s^{x1}$ in FIG. 6. It should be noted that these items differ from the governor of the synchronous generator. As shown in equation (23), no damping effect is provided, which means the power system with only DFIG wind turbine cannot guarantee the frequency stability.

$$\lim_{s \to 0} (G_{eq}^{\{\cdot\}}(s)) = 0. \quad (23)$$

Moreover, the constant term $C_{eq}^{\{\cdot\}}$ is included, and the branch related to $C_{eq}^{\{\cdot\}} \Delta P_s$ contributes to the equivalent rotor speed. Since the active power of DFIG wind turbine changes immediately after disturbance, this term will lead to a sudden step in frequencies of emf and electrical quantity near the wind turbine. The total step in frequency is given as follows:

$$C_{eq}^{tol} = C_{eq}^{\omega,PLL} + C_{eq}^{\omega m'} + C_{eq}^{x1'}, \quad (24)$$

Where $C_{eq}^{\omega m'} = h_{D\omega} C_{eq}^{\omega m}$, $C_{eq}^{x1'} = h_{Dx} C_{eq}^{x1}$.

B. Considering Frequency Spatial Variation

Due to the fact that the equivalent emf phase angle is modeled as a combination of state variables, the dynamics of DFIG wind turbine in frequency dynamics timescale can be represented by a voltage source. As the precondition of frequency spatial variation, the DFIG wind turbine can actively pick up the disturbance power because the equivalent emf phase angle would not be changed right after the disturbance. In analogy with the synchronous generator, the disturbance power $\Delta P_{s,w}$ picked up by w-th DFIG wind turbine can be described by the synchronous power coefficient $SPC_{w,dist}$ between the DFIG and the disturbance location, as follows:

$$SPC_{w,dist} = \frac{E_{eq0,w} U_{0,dist}}{X_{w,dist}} \cos(\delta_{eq0,w} - \theta_{0,dist})_2, \quad (25a)$$

$$\Delta P_{s,w} = \frac{SPC_{w,dist}}{\sum_{\forall g} SPC_{g,dist} + \sum_{\forall w} SPC_{w,dist}} \Delta P_{dist}, \quad (25b)$$

where $SPC_{g,dist}$ is the SPC for the synchronous generator; $\Delta P_{dist}$ and $\theta_{0,dist}$ are the disturbing power and pre-disturbance steady-state voltage phase angle at disturbance location; $X_{w,dist}$ is the reactance between the DFIG emf and the disturbance location. Considering the topology and parameters of the power grid are pre-defined, $X_{w,dist}$ mainly depends on the equivalent transient reactance $X_{eq0}$ of the DFIG wind turbine.

Furthermore, the equivalent rotor speed of the DFIG wind turbine can affect the frequency of nearby electrical quantity. The degree of such effect is determined by the equivalent transient reactance $X_{eg0}$, e.g., the smaller the transient reactance, the greater the impact. Quantitative analysis can be performed based on Frequency Divider.

As can be seen from the above analysis, the transient reactance $X_{eg0}$ has a great influence on the frequency spatial variation. For the synchronous generator, the transient reactance $X_G$ is constant and depends on the manufacturing. However, as seen from the equation (11), the equivalent transient reactance $X_{eg0}$ of DFIG wind turbine is the sum of two terms, where the first term is the stator reactance of the DFIM, and the second item is introduced due to the existence of the active power calculation module. For the first term, the stator reactance of the DFIM is relatively large in per unit due to its small capacity, which means that the electrical distance between the DFIG and the power grid is large. The second term is time-varying, considering that the equation (11) includes the $v_0$, $Q_{e0}$, and $U^*_s$. In addition, the value can be adjusted manually due to the presence of $k_{p1}$. For example, increasing $k_{p1}$ can improve the tracking performance of the active power control loop, at the same time, the electrical distance would be increased.

The simplified transient model of the DFIG wind turbine can improve the power system operations. On the one hand, power system dispatchers need to analyze the power system frequency dynamics offline or online to prevent outages caused by frequency instability. Based on the DFIG operating point information (including active power, reactive power, terminal voltage, and wind speed) and DFIG parameters (including mechanical inertia, DFIM reactance, and controller parameters), the DFIG can be modeled in the form of a synchronous generator. By combining the DFIG simplified model with the operating conditions of the synchronous generator, the power system frequency dynamics can be analyzed in simplified ways, such as in the COI frequency frame or the frequency spatial variation frame. On the other hand, when frequency dynamics deteriorates, the system operating point (such as the DFIG operating point) should be adjusted to ensure frequency stability. With the DFIG simplified model, DFIG operating points or control parameters can be accurately adjusted to increase the DFIG inertia response capacity.

IV. CASE STUDIES

In this Section, the correctness of disclosed simplified transient model for the DFIG wind turbine is verified, and the mechanism of the DFIG wind turbine participating in power system frequency dynamics is illustrated. Due to space limitation, simulations are carried out on a relatively small test system.

A. Description of the Test System

Figure 7:
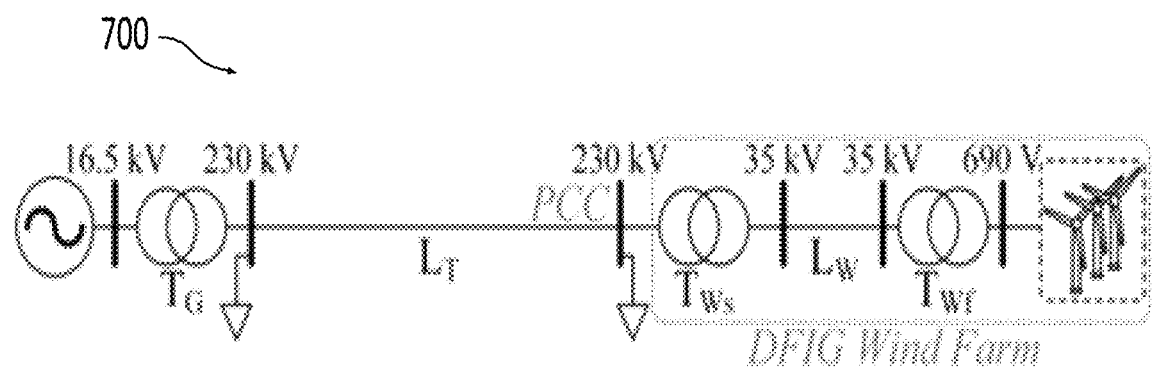
FIG. 7 shows a topology of a test system according to an embodiment of the present disclosure.

FIG. 7 shows a topology of a test system 700 according to an embodiment of the present disclosure. The topology of the test system 100 is shown in FIG. 7. One 300 MVA synchronous generator and a wind farm with 60×1.5 MW DFIG wind turbines are interconnected by a long-distance transmission line. The DFIG wind turbines are connected to the point of common coupling (PCC) through two step-up transformers and the feeder line. Total loads of 150 MW are connected on both sides of the transmission line. The disturbance is set as the active power sudden increase of load connected at PCC by 10 MW at $t_{dist}$=0 s. The models of the synchronous generator and the governor are Park's equation and the model, respectively, and the detailed model of the DFIG wind turbine given in Appendix A is used.

For the base case analysis, the inertia constant HG and transient reactance $X_G$ of the synchronous generator are 1 s and 0.56 p.u., respectively. The parameters of the DFIG wind turbine are: $X_s$=3.07 p.u., $X_m$=2.90 p.u., $R_s$=0.0001 p.u., $H_W$=0.5 s, $v_0$=10 m/s, $U^*_s$=1 p.u., $k_{pPLL}$=0.03, $K_{iPLL}$=0.08, $k_{p1}$=0.2, and $k_{i1}$=0.5. The reactances of transmission line and transformer are: $X_{TG}$=0.10 p.u., $X_{LT}$=1.32 p.u., and $X_{TWs}+X_{LW}+X_{Twf}$=0.12 p.u.. It should be noted that the parameters of the synchronous generator and the DFIG are normalized based on their rated capacity, and the parameters of lines and transformers are normalized based on system capacity of 390 MVA. The detailed parameters are given in the Appendix C. The reactive power output $Q_{e0}$ of the DFIG is set as 0. It can be seen that a weak power system with long-distance tie lines and low synchronous inertia is established, where the frequency spatial variation can be highlighted. All simulations are performed on Matlab/Simulink.

B. Validation of the Simplified Transient Model

Figure 8:
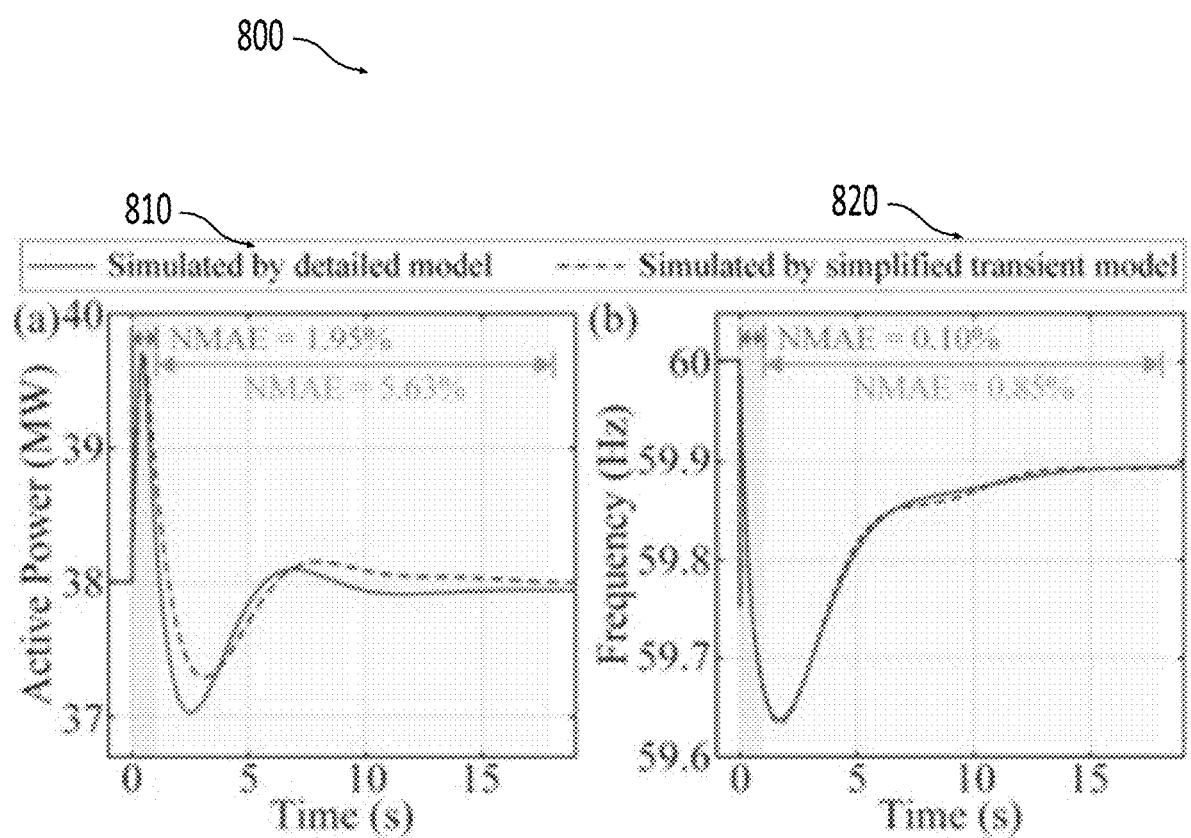
FIG. 8 shows simulation results of active power outputs and terminal voltage frequency of the DFIG wind turbine according to an embodiment of the present disclosure.

The detailed model of the DFIG wind turbine is replaced with the disclosed simplified transient model, and the simulation is repeated with the same disturbance condition. FIG. 8 shows a diagram 800 of simulation results of active power outputs 810 and terminal voltage frequency 820 of the DFIG wind turbine according to an embodiment of the present disclosure. The simulation results are shown in FIG. 8, where the diagrams (a) and (b) show the active power 810 and the terminal voltage frequency 820 of the DFIG, respectively.

As can be seen, the DFIG active power outputs with the simplified transient model are very close to that of the detailed model, and the terminal voltage frequency curves of the two models are basically the same. The nominal mean absolute error (NMAE) index, defined in equation (26), is adopted to quantify the similarity of the dynamics. During the inertia response time scale, which is chosen as [0+, 1s] in this case, the NMAEs of active power outputs and frequency are 1.95% and 0.10%, respectively; while during the primary frequency control time scale, say (1s, 18s], the NMAEs are 5.63% and 0.85%, which validate the accuracy of the proposed model.

$$NMAE = \frac{1}{t_{end} - t_{sta}} \int_{t_{sta}}^{t_{end}} \left| \frac{y_{det} - y_{pro}}{\Delta y_{det}} \right| dt \times 100\%, \quad (26)$$

Where $t_{sta}$ and $t_{end}$ are the start and end time of the evaluation, respectively; $y_{det}$ and $y_{pro}$ are the curves for the detailed model and disclosed simplified model, respectively; $\rightarrow y_{det}$ is the maximum of the curve difference of those two models.

Figure 9:
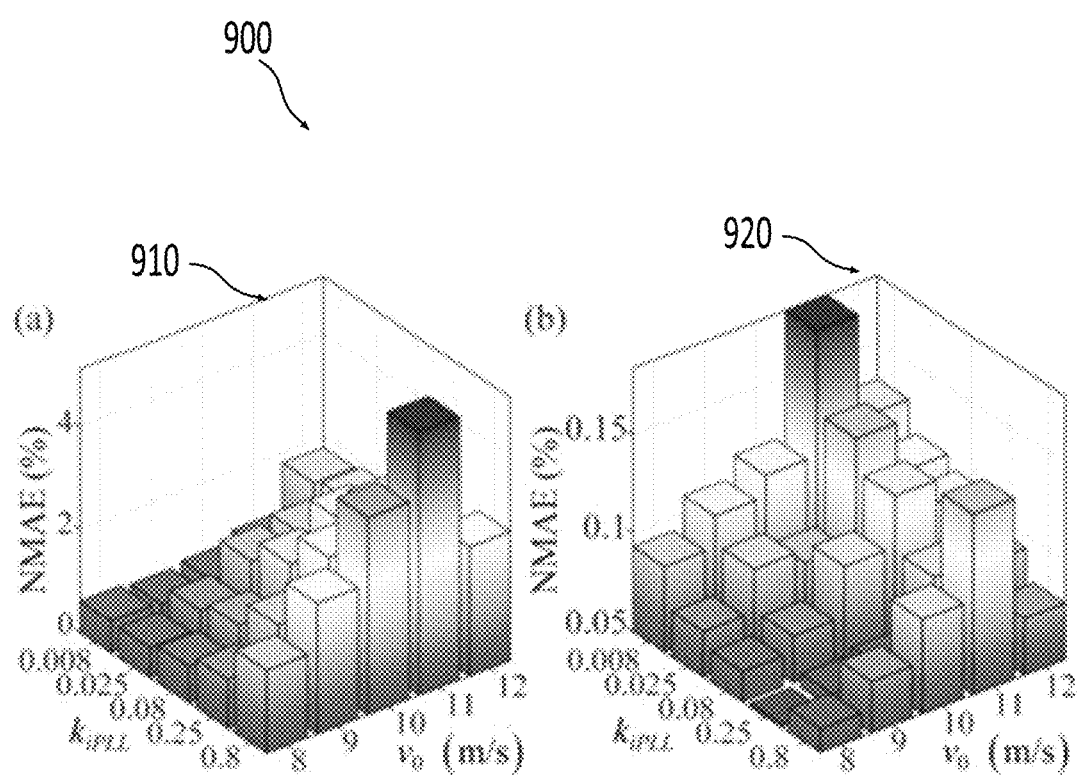
FIG. 9 shows nominal mean absolute error (NMAE) indexes of active power and terminal voltage frequency under different wind speeds and PLL integral control parameters according to an embodiment of the present disclosure.

FIG. 9 shows a diagram 900 of nominal mean absolute error (NMAE) indexes of active power 910 and terminal voltage frequency 920 under different wind speeds and PLL integral control parameters according to an embodiment of the present disclosure. The disclosed simplified transient model has also been verified under different steady-state wind speed $v_0$ and PLL integral control parameter $k_{iPLL}$. Taking the [0+, 1s] time period as an example, the NMAE between the curves of the detailed model and the disclosed model are shown in FIG. 9. The maximum NMAEs for the active power outputs and frequency are 5.11% and 0.13%, respectively, which is also acceptable for the frequency dynamics analysis.

C. DEIG Dynamics Analysis

Figure 10:
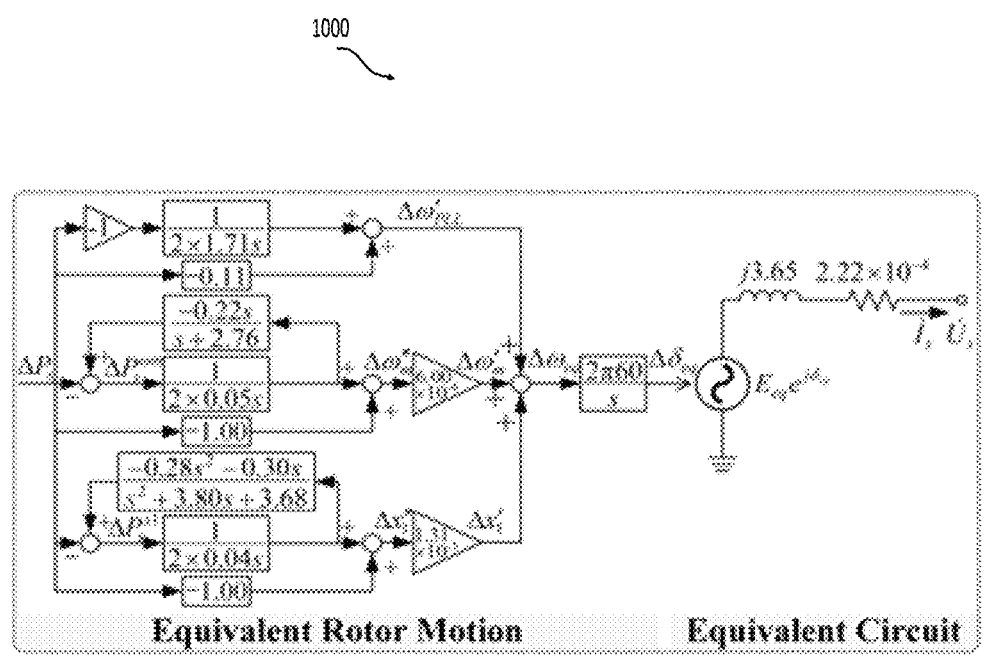
FIG. 10 shows a diagram of a DFIG simplified transient model under the base case parameters according to an embodiment of the present disclosure.
Figure 11:
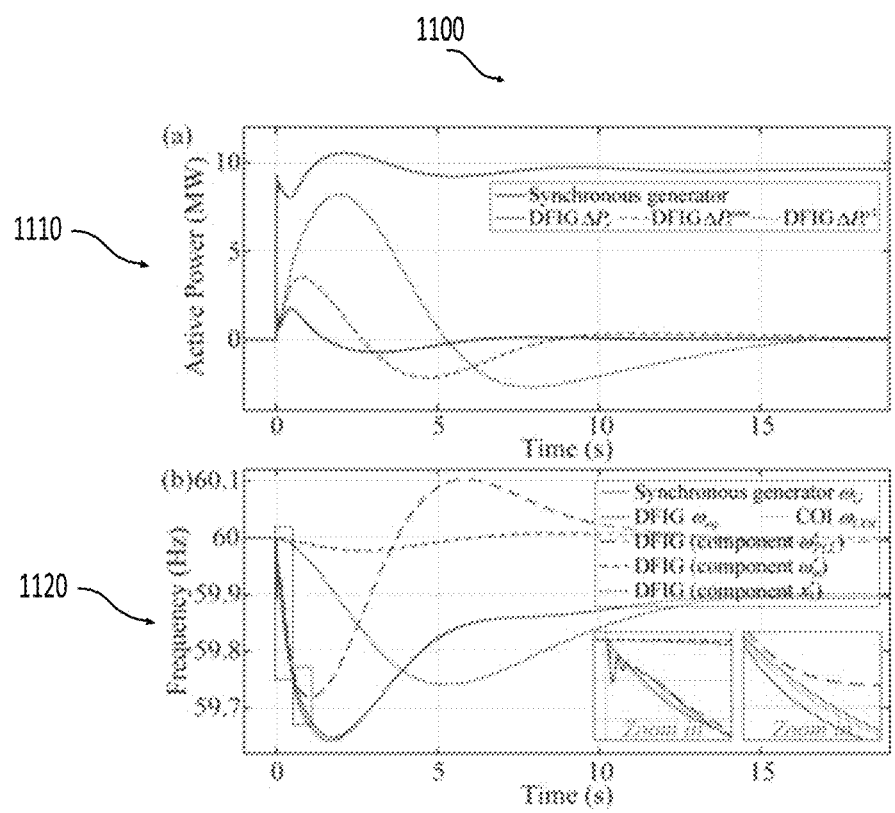
FIG. 11 shows incremental active power curve and post-disturbance frequency dynamics curve according to an embodiment of the present disclosure.

FIG. 10 shows a diagram 1000 of a DFIG simplified transient model under the base case parameters according to an embodiment of the present disclosure. FIG. 11 shows a diagram 1100 of incremental active power curve and post-disturbance frequency dynamics curve according to an embodiment of the present disclosure. According to the parameters listed in Section IV-A, the parameterized DFIG simplified transient model is shown in FIG. 10. The post-disturbance active power and frequency dynamics are shown in FIG. 11.

1) COI Frequency Dynamics: the diagram 1120 in FIG. 11 shows the rotor speed $\omega_G$ of the synchronous generator and the equivalent rotor speed $\omega_{eq}$ of the DFIG wind turbine. According to the equation (21), the COI frequency $\omega_{COI}$ formed by the above two frequency sources is also shown in the diagram 1120, and the COI inertia $H_{COI}$ is 1.14 s. The inertia constant $H_g$ of synchronous generator and total equivalent inertia $H_{eq}^{tol}$ of DFIG wind turbine are 1 s and 1.59 s, respectively, and the latter seems larger. However, because the nominal capacity of the synchronous generator is much larger than the DFIG, the COI frequency and COI inertia are mainly affected by the synchronous generator. It can be verified by the closer distance between the COI frequency and the synchronous generator rotor speed, as shown in the diagram 1120.

Figure 12:
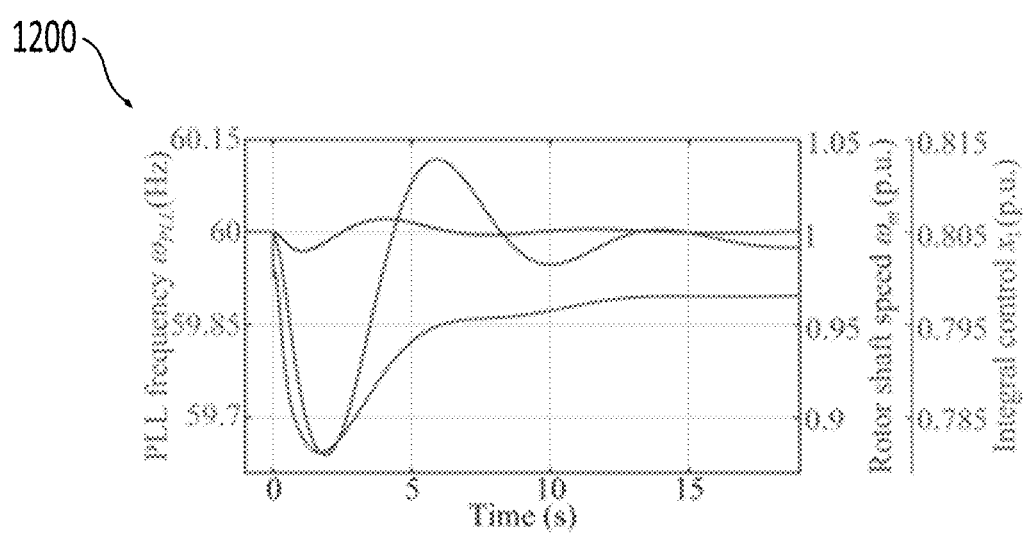
FIG. 12 shows dynamics of three state variables in frequency dynamic timescale according to an embodiment of the present disclosure.

FIG. 12 shows a diagram 1200 of dynamics of three state variables in frequency dynamic timescale according to an embodiment of the present disclosure. The three components of the DFIG equivalent rotor speed are also given in the diagram 1120, i.e., $\omega'_{PLL}$, $\omega'_m$, and $x'_1$. The corresponding state variables are shown in FIG. 12, where the PLL phase angle is replaced by the PLL frequency for frequency dynamics analysis. It can be seen that since PLL is designed to simulate the synchronization mechanism of the synchronous generator, the dynamics of equivalent rotor speed is close to the PLL frequency, which leads to the component $\omega'_{PLL}$ contributing most to the equivalent rotor speed among all components. For the other two components, since the change of mechanical rotor speed on the basis of its steady-state value is smaller than that of the integral control variable, the influence of component $\omega'_m$ on equivalent rotor speed is the minimal. Due to the algebraic operation from FIG. 6 and FIG. 5, the dynamics of three components and corresponding state variables are not completely consistent, especially in a relatively long timescale.

2) Frequency Spatial Variation: The equivalent transient reactance $X_{eg0}$ of the DFIG wind turbine is 3.65 p.u. under its nominal capacity. However, $X_{eg0}$ of the DFIG under the system generation capacity, 390 MVA in this case, is 15.82 p.u. which is far larger than the reactance of any element in the power system. According to the SPC in the equation (25), the disturbance power picked up by the DFIG should be 6.13%, which is consistent with the diagram 1110 in FIG. 11.

Figure 13:
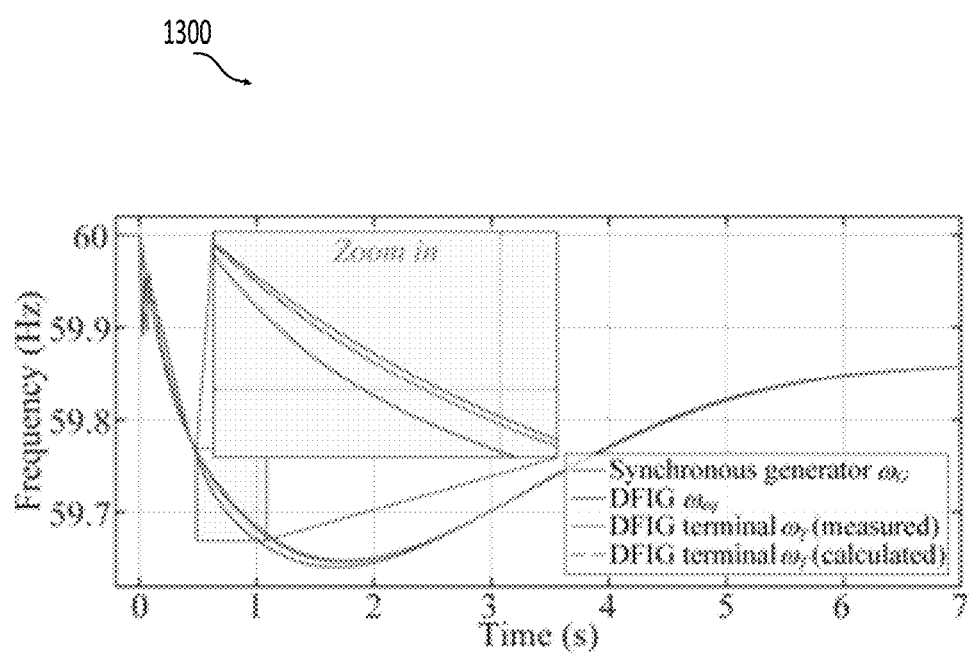
FIG. 13 shows system frequency spatial variation according to an embodiment of the present disclosure.

FIG. 13 shows a diagram 1300 of system frequency spatial variation according to an embodiment of the present disclosure. As shown in FIG. 13, the frequency $\omega_T$ measured at the terminal of the DFIG wind turbine is illustrated. The frequencies differ with the measurement locations, indicating DFIG has the property of voltage source and the equivalent rotor speed $\omega_{eq}$ can affect the power system network frequency. It should be noted that since the equivalent transient reactance of DFIG is large, the DFIG terminal frequency $\omega_T$ is closer to the rotor speed $\omega_G$ of the synchronous generator.

Taking the Frequency Divider model as an example, $\omega_T$ calculated by the weighted sum of $\omega_G$ and $\omega_{eq}$ according to the spatial variation of reactance is shown in FIG. 13. It can be seen that the calculated $\omega_T$ is consistent with its actual dynamics, which indicates the equivalent circuit model can be applied to the frequency spatial variation analysis.

D. Time-Varying and Adjustable Characteristics

As described in Section III, the system operating point and DFIG control parameters jointly determine the simplified transient model of the DFIG wind turbine, which means the equivalent inertia and equivalent transient reactance are time-varying and adjustable.

Figure 14:
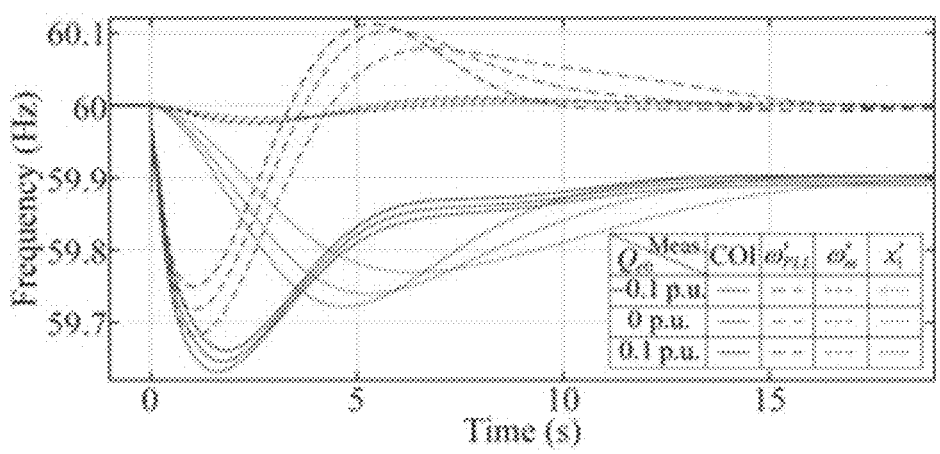
FIG. 14 shows COI frequency dynamics when changing reactive power of DFIG according to an embodiment of the present disclosure.

FIG. 14 shows a diagram 1400 of COI frequency dynamics when changing reactive power of DFIG according to an embodiment of the present disclosure. The dynamics of the COI frequency and three components of the DFIG equivalent rotor speed are shown in FIG. 14 when the changing steady-state reactive power $Q_{e0}$ of the DFIG. Compared with the values of the equivalent inertia in Section IV-C, when $Q_{e0}=-0.1$ p.u., the total equivalent inertia $H_{eq,w}^{tol}$ 1.19 s, and the components $H_{eq}^{\omega PLL}$, $H_{eq}^{\omega m'}$, and $H_{eq}^{x1t}$ are 1.25 s, 90.58 s, and 36.28 s, respectively; while $Q_{e0}=0.1$p.u., the equivalent inertia terms would be $H_{eq,w}^{tol}=2.06$ s, $H_{eq}^{\omega PLL}=2.29$ s, $H_{eq}^{\omega m'}=72.51$ s, and $H_{eq}^{x1t}=29.04$ s. With the reactive power increment, the total equivalent inertia increases, which is consistent with the improvement of decreasing rate and nadir of the COI frequency in FIG. 14. Further, this improvement is mainly contributed by the increase of component $H_{eq}^{\omega PLL}$ by the mechanism: $Q_{e0}\uparrow \Rightarrow i_{rq0}^P\uparrow \Rightarrow E_{eg0}\uparrow \Rightarrow$ reducing the linearization degree of active power flow equation $\Rightarrow H_{eq}^{\omega PLL}\uparrow$. In addition, although the component $H_{eq}^{x1t}$ decreases, it mainly affects the frequency dynamics in a relatively long timescale when the COI frequency begins to rebound.

Figure 15:
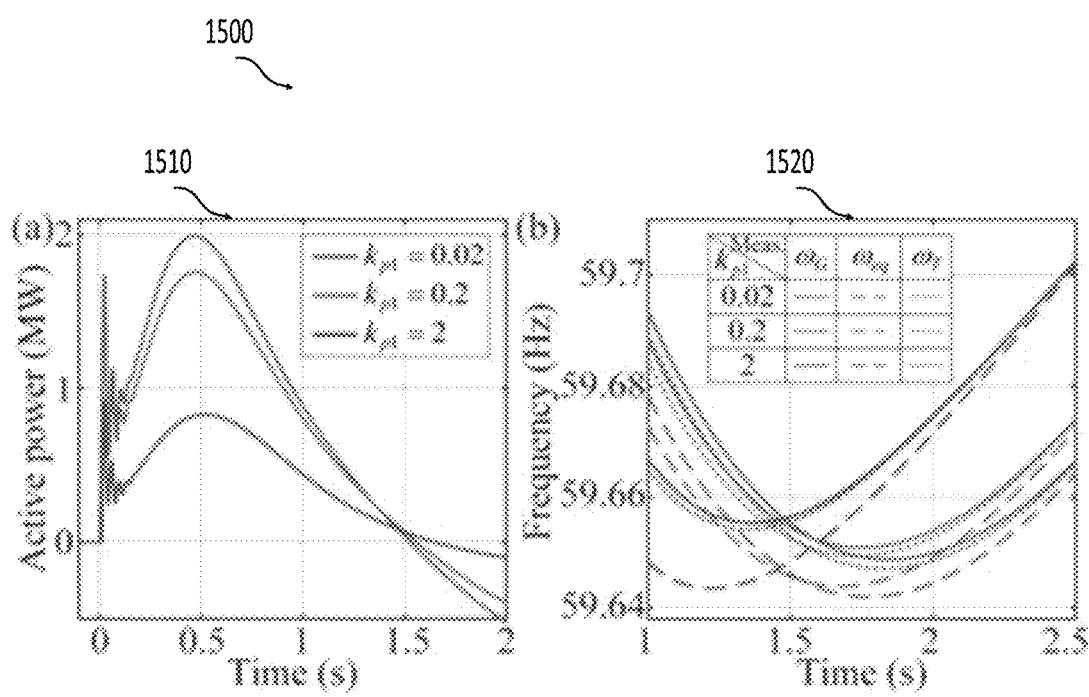
FIG. 15 shows frequency spatial variation from the perspective of disturbance power distribution and frequency difference according to an embodiment of the present disclosure.

FIG. 15 shows a diagram 1500 of frequency spatial variation from the perspective of disturbance power distribution and frequency difference according to an embodiment of the present disclosure. FIG. 15 shows the disturbance power distribution and frequencies at different measurement locations when changing the proportional parameter $k_{p1}$ of active power control. When $K_{p1}$ equals 0.02 and 2, the equivalent reactance of the DFIG wind turbine is 3.13 and 8.87 p.u., respectively. With the decrease of $k_{p1}$, the disturbance power picked up by the DFIG increases, as shown in the diagram 1510 in FIG. 15, and the frequency measured at the DFIG terminal is closer to the equivalent rotor speed as shown in the diagram 1520 in FIG. 15. The results show that the effect of the DFIG on frequency dynamics spatial distribution is adjustable.

Figure 16:
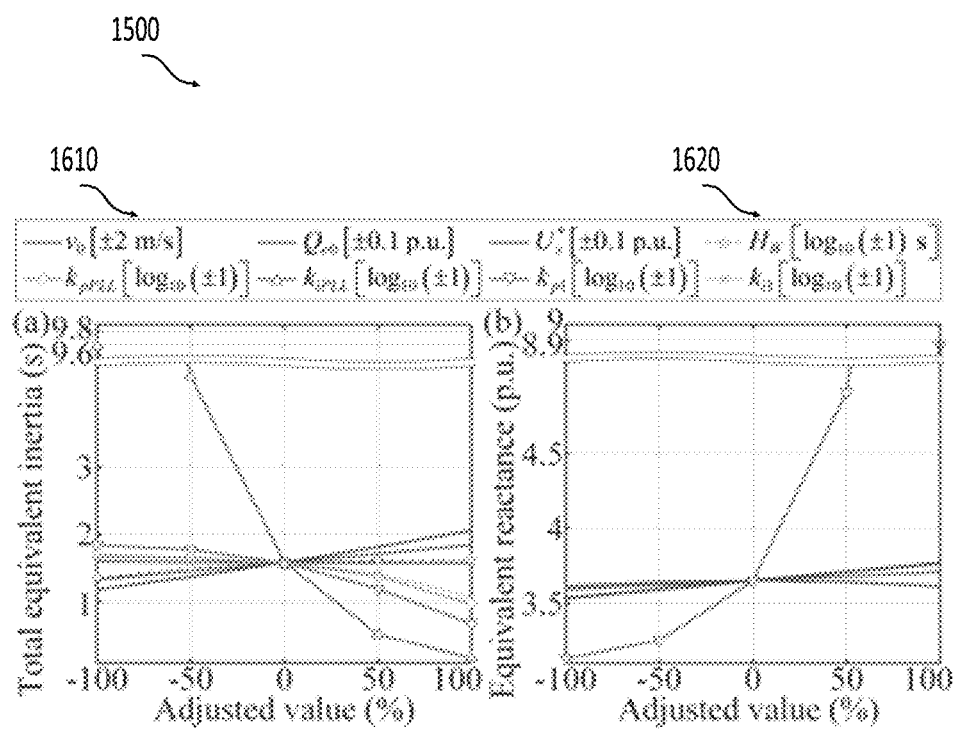
FIG. 16 shows influencing sensitivity of different quantities on equivalent inertia and equivalent transient reactance according to an embodiment of the present disclosure.

FIG. 16 shows a diagram 1600 of influencing sensitivity of different quantities on equivalent inertia and equivalent transient reactance according to an embodiment of the present disclosure. The impacts of all types of operating points, control parameters, and mechanical inertia on the equivalent inertia and the equivalent transient reactance are summarized in FIG. 16. The x-axis is the adjusted value of all variables based on the base case parameters setting in Section IV-A, e.g., changing wind speed $v_0$ from (10−2) m/s to (10+2) m/s. From the diagram 1610 in FIG. 16, the integral control parameter of PLL has the greatest impact on the equivalent inertia. On the contrary, the mechanical inertia and wind speed of DFIG have little impact. For the equivalent transient reactance in the diagram 1620 in FIG. 16, only four quantities have impacts on it, and the largest impact is from $k_{p1}$.

E. Comparison With the Constant Power Model

Figure 17:
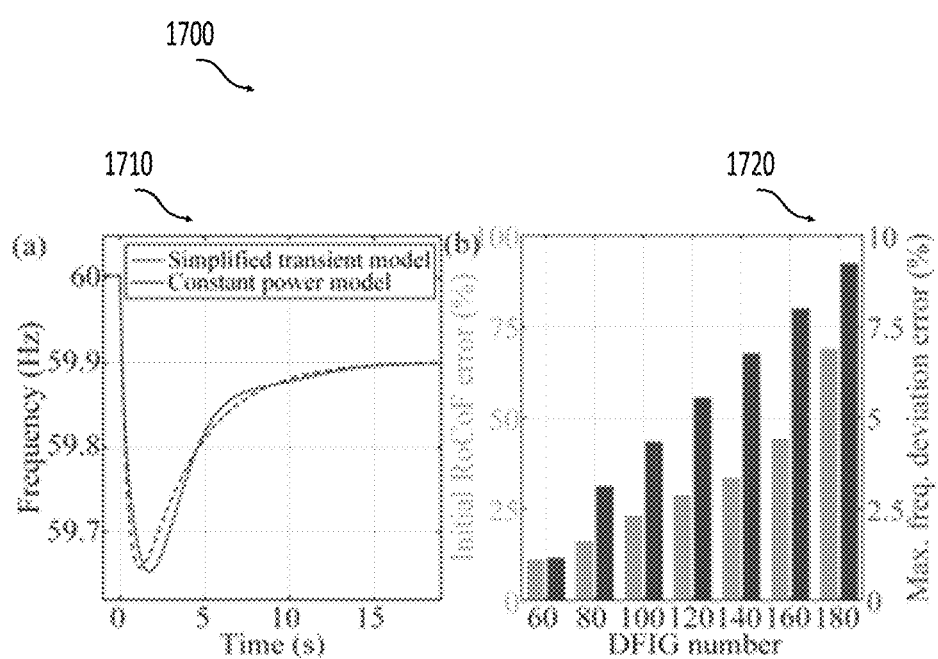
FIG. 17 shows a frequency comparison with 60 DFIG wind turbines and error indexes with DFIG number increasing according to an embodiment of the present disclosure.

FIG. 17 shows a diagram 1700 of a frequency comparison with 60 DFIG wind turbines and error indexes with DFIG number increasing according to an embodiment of the present disclosure. It is common to model the DFIG wind turbine as a constant power source when the VI control and wind speed variations are not considered. The simulation is repeated when the constant power model of the DFIG wind turbine is used, and the DFIG terminal frequency is given in the diagram 1710 in FIG. 17. It can be seen the frequency drops more moderately at the initial stage after disturbance when the disclosed simplified transient model is used because the DFIG equivalent inertia is taken into account. However, the maximum frequency deviation is larger because the DFIG wind turbine absorbs energy from the power grid when the DFIG mechanical rotor speed returns to the MPPT operating point, which is described by the non-inertia term in the disclosed simplified transient model. Specifically, the post-disturbance initial RoCoF with the disclosed simplified transient model and the constant power model are −0.59 Hz/s and −0.66 Hz/s, respectively, and the maximum frequency deviations are −0.350 Hz and −0.346 Hz. The absolute errors of the above two indexes with the constant power model are 11.17% and 1.15%, respectively.

With the increase of DFIG penetration, the errors of the indexes are given in the diagram 1720 in FIG. 17. The maximum DFIG number in the wind farm is 180 under the parameter settings in this study, as the test system will not be stable with more than 180 DFIG wind turbines. At this point, the errors of the initial RoCoF and maximum frequency deviation would reach 68.99% and 9.22%, respectively, which could not be adopted in power system frequency dynamics analysis and control.

V. CONCLUSION

The present disclosure aims to establish a simplified transient model of DFIG wind turbines for power system frequency dynamics analysis. The disclosed simplified transient model includes two parts, i.e., the equivalent circuit model and the equivalent rotor motion model. In the former, the equivalent emf is modeled as a combination of three state variables, and the phasor form reformulation is facilitated by introducing a DFIG current-based equation. In the latter, the relationship between imbalanced stator active power and equivalent rotor speed is depicted by equivalent inertia and non-inertia terms. Then, the mechanism of the DFIG wind turbine participating in frequency dynamics is explained. For the COI frequency dynamics, the DFIG wind turbine and synchronous generator together contribute to the COI frequency and COI inertia, while the DFIG is unique in terms of frequency sources, inertia characteristics, and non-inertia terms. For the frequency spatial variation, DFIG can act as a voltage source to actively pick up the disturbance power and change the nearby bus frequency. The equivalent inertia and equivalent transient reactance of the DFIG wind turbine are time-varying and adjustable.

The accuracy of the disclosed simplified transient model is verified by simulation results under various operating points and parameter settings. The PLL-related variable contributes most to the DFIG equivalent speed among the three state variables. Due to the small capacity of the DFIG wind turbine, its equivalent inertia and equivalent transient reactance are much smaller and much larger than synchronous generators, respectively. The above two equivalent parameters are dominated by the integral parameter of the PLL and the proportional parameter of the active power control loop, respectively.

VI. TECHNICAL IMPLEMENTATION OF THE DISCLOSED METHOD

Figure 18:
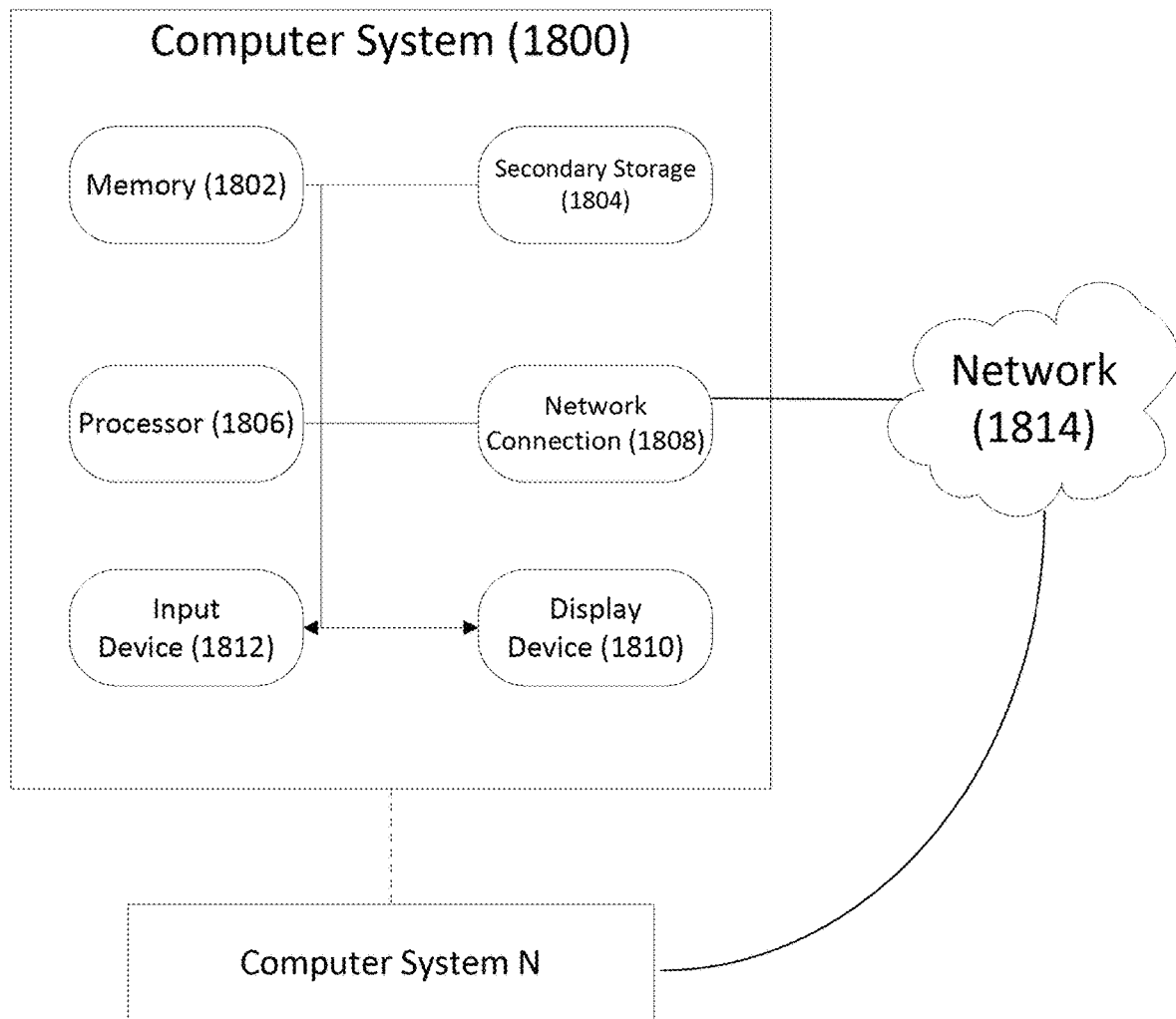
FIG. 18 illustrates an exemplary computer system that can be used to implement the disclosed method partially or wholly, according to an embodiment of the present disclosure.

In some embodiments, the system disclosed herein may comprise a computer system to implement the disclosed method and analysis. FIG. 18 illustrates an exemplary computer system 1800 that can be used to implement the disclosed method partially or wholly. The computer system 1800, or other computer systems similarly configured, may include and execute one or more subsystem components to perform functions described herein, including the steps/blocks of various flow processes, measurements and/or analyses described above. Likewise, a mobile device, a cell phone, a smartphone, a laptop, a desktop, a notebook, a tablet, a wearable device, a server, etc., which includes some of the same components of the computer system 1800, may run an application (or software) and perform the steps and functionalities described above. The computer system 1800 may connect to a network 1814, e.g., Internet, or other network, to receive inquiries, obtain data, and/or transmit information as described above.

The computer system 1800 typically includes a memory 1802, a secondary storage device 1808, and a processor 1806. The computer system 1800 may also include a plurality of processors 1806 and be configured as a plurality of, e.g., bladed servers, or other known server configurations. The computer system 1800 may also include a network connection device 1808, a display device 1810, and an input device 1812.

The memory 1802 may include RAM or similar types of memory, and it may store one or more applications for execution by the processor 1806. The secondary storage device 1808 may include a hard disk drive, floppy disk drive, CD-ROM drive, or other types of non-volatile data storage. The processor 1806 executes the application(s), such as those described herein, which are stored in the memory 1802 or secondary storage 1808, or received from the Internet or other network 1818. The processing by processor 1806 may be implemented in software, such as software modules, for execution by computers or other machines. These applications preferably include instructions executable to perform the system and subsystem component functions and methods described above and illustrated in the FIGSs. herein. The applications preferably provide graphical user interfaces (GUIs) through which users may view and interact with the subsystem components.

The computer system 1800 may store one or more database structures in the secondary storage 1804, for example, for storing and maintaining the information/data necessary to perform the above-described functions. Alternatively, such information/data may be in storage devices separate from these components.

Also, as noted, the processor 1806 may execute one or more software applications to provide the functions described in this specification, specifically to execute and perform the steps and functions in the process flows, measurements and/or analyses described above. The GUIs may be formatted, for example, as web pages in HyperText Markup Language (HTML), Extensible Markup Language (XML) or in any other suitable form for presentation on a display device depending upon applications used by users to interact with the computer system 1800.

The input device 1812 may include any device for entering information into the computer system 1800, such as a touch-screen, keyboard, mouse, cursor-control device, microphone, digital camera, video recorder or camcorder. The input and output device 1812 may be used to enter information into GUIs during performance of the methods described above. The display device 1810 may include any type of device for presenting visual information such as, for example, a computer monitor or flat-screen display (or mobile device screen). The display device 1810 may display the GUIs and/or output from sub-system components (or software).

Examples of the computer system 1800 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 1800 is shown in detail, the computer system 1800 may use multiple computer systems or servers as necessary or desired to support the users and may also use back-up or redundant servers to prevent network downtime in the event of a failure of a particular server. In addition, although the computer system 1800 is depicted with various components, one skilled in the art will appreciate that the computer system 1800 can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 1800, to perform a particular method, such as methods described above.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

APPENDIX

A. Detailed Model of DFIG Wind Turbine

1) Nomenclature: For the variables:

$P_e/Q_e$ Active power/reactive power $U_s/\theta_s/u_{sd}/u_{sq}$ Amplitude/phase angle/d-axis component/q-axis component of stator voltage (i.e., terminal voltage)

$i_{sd}/i_{sq}$ d-/q-axis component of stator current $\psi_{sd}/\psi_{sq}$ d-/d-axis component of stator flux $u_{rd}/u_{rq}$ d-/q-axis component of rotor voltage $i_{rd}/i_{rq}$ d-/q-axis component of rotor current $\psi_{rd}/\psi_{rq}$ d-/d-axis component of rotor flux $T_e/T_m$ Electromagnetic/mechanical torque $\omega_m/\theta_m$ Speed/phase angle of mechanical rotor v Wind speed $x_1/x_2$ Integral state variable inside the active power/terminal voltage control loop $x_3/x_4$ Integral state variable inside the d-/q-axis current control loop $\theta_{PLL}/x_{PLL}$ Output phase angle/integral state variable of PLL $\omega_{PLL}$ PLL frequency For the parameters $\omega_N$ Nominal frequency $\omega_s$ Nominal mechanical rotor speed $X_m/X_s/X_r$ Magnetizing/stator/rotor reactance $R_s/R_r$ Stator/rotor resistance $H_W$ Total mechanical inertia from DFIM and wind turbine $k_{p1}/k_{i1}$ Proportional/integral parameter of active power control loop $k_{p2}/k_{i2}$ Proportional/integral parameter of terminal voltage control loop $k_{p3}/k_{i3}$ Proportional/integral parameter of d-axis current control loop $k_{p4}/k_{i4}$ Proportional/integral parameter of q-axis current control loop $\xi_M$ MPPT control coefficient
$K_{pPLL}/k_{ipLL}$ PLL proportional/integral control parameter
f(·) Nonlinear algebraic equation for wind turbine aerodynamics 2) Mathematical Equations: For the primary equipment, (A.1)-(A.8) are the circuit equations of DFIM in dq-axis. (A.9) represents the mechanical rotor motion of DFIM, where the electromagnetic torque $T_e$ of DFIM is given in (A.10) and the mechanical torque $T_m$ depends on the aerodynamics of wind turbine as shown in (A.11).

$$u_{sd} = \frac{1}{\omega_N}\frac{d\psi_{sd}}{dt} - \omega_s\psi_{sq} - R_s i_{sd}, \quad (A.1)$$

$$u_{sq} = \frac{1}{\omega_N}\frac{d\psi_{sq}}{dt} + \omega_s\psi_{sd} - R_s i_{sq}, \quad (A.2)$$

$$u_{rd} = \frac{1}{\omega_N}\frac{d\psi_{rd}}{dt} - (\omega_s - \omega_m)\psi_{sq} + R_r i_{rd}, \quad (A.3)$$

$$u_{rq} = \frac{1}{\omega_N}\frac{d\psi_{rq}}{dt} + (\omega_s - \omega_m)\psi_{sd} + R_r i_{rq}, \quad (A.4)$$

$$\psi_{sd} = -X_s i_{sd} + X_m i_{rd}, \quad (A.5)$$

$$\psi_{sq} = -X_s i_{sq} + X_m i_{rq}, \quad (A.6)$$

$$\psi_{rd} = -X_m i_{sd} + X_r i_{rd}, \quad (A.7)$$

$$\psi_{rq} = -X_m i_{sq} + X_r i_{rq}, \quad (A.8)$$

$$2H_W \frac{d\omega_m}{dt} = T_e - T_m, \quad (A.9)$$

$$T_e = -\psi_{sd} i_{sq} - \psi_{sq} i_{sd}, \quad (A.10)$$

$$T_m = f(\omega_m, v). \quad (A.11)$$

For the control modules, the equations of PI controllers of active power loop, terminal voltage loop, and dq-axis current loops are given in (A.12) and (A.13), (A.14) and (A.15), and (A.16)-(A.19), respectively. The MPPT control module is represented by (A.20). The power and voltage calculation modules and PLL are represented by (A.21), (A.22), and (A.23)-(A.26), respectively, which are given in dq-axis.

$$\frac{dx_1}{dt} = P_e^* - P_e, \quad (A.12)$$

$$i_{rd}^{P*} = k_{p1}(P_e^* - P_e) + k_{i1}x_1, \quad (A.13)$$

$$\frac{dx_2}{dt} = U_s^* - U_s, \quad (A.14)$$

$$i_{rq}^{P*} = k_{p2}(U_s^* - U_s) + k_{i2}x_2, \quad (A.15)$$

$$\frac{dx_3}{dt} = i_{rd}^{P*} - i_{rd}^P, \quad (A.16)$$

$$u_{rd}^{P*} = k_{p3}(i_{rd}^{P*} - i_{rd}^P) + k_{i3}x_3, \quad (A.17)$$

$$\frac{dx_4}{dt} = i_{rq}^{P*} - i_{rq}^P, \quad (A.18)$$

$$u_{rq}^{P*} = k_{p4}(i_{rq}^{P*} - i_{rq}^P) + k_{i4}x_4, \quad (A.19)$$

$$P_e^* = \xi_M \omega_m^3, \quad (A.20)$$

$$P_e = u_{sd}(-i_{sd} + i_{rd}) + u_{sq}(-i_{sq} + i_{rq}), \quad (A.21)$$

$$U_s = \sqrt{u_{sd}^2 + u_{sq}^2}, \quad (A.22)$$

$$\frac{d\theta_{PLL}}{dt} = \omega_N(\omega_{PLL} - 1), \quad (A.23)$$

$$\omega_{PLL} = k_{pPLL}u_{sq}^P + k_{iPLL}x_{PLL}, \quad (A.24)$$

$$\frac{dx_{PLL}}{dt} = u_{sq}^P, \quad (A.25)$$

$$u_{sq}^P = U_s \sin(\theta_s - \theta_{PLL}). \quad (A.26)$$

B. Detailed Expressions of Simplified Transient Model

1) Variables in Steady State: The expressions are as follows $$\omega_{m0} = \frac{v_0}{v_N}, \quad (B.1)$$

$$P_{e0} = \xi_M \omega_{m0}^3, \quad (B.2)$$

$$x_{10} = \frac{\omega_s \xi_M X_s \omega_{m0}^2}{X_m k_{i1} U_s^*}, \quad (B.3)$$

$$i_{rq0}^P = -\frac{\omega_s X_s Q_{e0} + U_s^{*2}}{\omega_s X_m U_s^*}, \quad (B.4)$$

where (B.3) and (B.4) can be deduced a prior work.

2) Linearization Coefficients: The linearization coefficients of equivalent rotor speed and other nonlinear modules are given in (B.5) and (B.6), and (B.7) and (B.8), respectively. $h_{Tm}$ in the equation (17a) highly depends on the manufacture of wind turbine and is not given in the present disclosure.

$$h_{D\omega} = -\frac{3\xi_M k_{p1} \omega_{m0}^2}{\omega_N \left( i_{rq0}^P + \frac{(\xi_M k_{p1} \omega_{m0}^3 + k_{i1} x_{10})^2}{i_{rq0}^P} \right)}, \quad (B.5)$$

$$h_{Dx} = -\frac{k_{i1}}{\omega_N \left( i_{rq0}^P + \frac{(\xi_M k_{p1} \omega_{m0}^3 + k_{i1} x_{10})^2}{i_{rq0}^P} \right)}, \quad (B.6)$$

$$h_{MPT} = 3\xi_M \omega_{m0}^2, \quad (B.7)$$

$$h_{Pf} = \frac{X_{eq0}}{\sqrt{E_{eq0} U_s^* - \left(\frac{X_{eq0} \xi_M \omega_{m0}^3}{1 - \frac{\omega_s - \omega_{m0}}{\omega_s}}\right)^2 \frac{1}{E_{eq0} U_s^*}}}. \quad (B.8)$$

C. Parameters of Test System

Synchronous Generator:
  Nominal value: $S_N$=300 MVA, $U_N$=16.5 kV, $f_N$=60 Hz
  Parameter: $X_d$=2.00 p.u., $X'_d$=0.43 p.u., $X''_d$=0.36 p.u., $X_q$=1.90 p.u., $X'_q$=0.70 p.u., $X''_q$=0.36 p.u., $X_r$=0.24 p.u., $T'_{d0}$=5.70 s, $T''_{d0}$=0.05 s, $T'_{q0}$=1.50 s, $T''_{q0}$=0.04 s, $H_g$=1 s Governor:
  $F_g$=0.25, T=15.0 s, $K_m$=0.95, $R_G$=0.05

DFIG Wind Turbine:
  Nominal value: $P_N$=1.5 MW, $U_N$=690 V, $f_N$=60 Hz, $v_N$=12 m/s
  Manufacturing: $X_s$=3.07 p.u., $X_r$+=3.06 p.u., $X_m$=2.90 p.u., $R_s$=0.0001 p.u., $R_r$=0.0001 p.u., $H_W$=0.5%
  Control: $k_{pPLL}$=0.03, $k_{iPLL}$=0.08, $k_{p1}$=0.2, $k_{i1}$=0.5, $k_{p2}$=1.25, $k_{i2}$=300, $k_{p3}$=$k_{p4}$=1, $k_{i3}$=$k_{i4}$=50 Operating point: $v_0$=10 m/s, $U^*_s$; =1 p.u.

Transmission Line and Transformer:
  Nominated in 390 MVA and 230 kV
  Parameter: $X_{TG}$=0.10 p.u., $X_{TWs}$+$X_{LW}$+$X_{TWf}$=0.12 p.u., $X_{LT}$=1.32 p.u., $R_{TG}$=0.0032 p.u., $R_{LT}$=0.0531 p.u., $R_{TWs}$+$R_{LW}$+$R_{TWf}$=0.0117 p.u.

What is claimed is:

1. A method of power system frequency dynamic analysis implemented in a power grid including a doubly-fed induction generator (DFIG) wind turbine, wherein the DFIG wind turbine includes a doubly-fed induction machine (DFIM), a wind turbine, and proportional-Integral (PI) controllers configured for a maximum power point tracking (MPPT) control module; a phase-locked loop (PLL) module, an active power control loop module, and an reactive power control loop module, the method comprising:

facilitating the DFIG wind turbine to be operated in a MPPT mode, generating a simplified transient model of the DFIG wind turbine, wherein the simplified transient model of the DFIG wind turbine includes an equivalent circuit model, $$E_{eq} e^{j\delta_{eq}} = \dot{U}_s + (R_{eq} + jX_{eq})\dot{I}_s, \tag{9}$$

$$R_{eq} = R_s - \frac{\omega_s X_m k_{p1} U_s^* \omega_m^2 P_e Q_e}{P_e^2 + \omega_m^2 Q_e^2}, \tag{10a}$$

$$X_{eq} = \omega_s X_s + \frac{\omega_s X_m k_{p1} U_s^* \omega_m P_e^2}{P_e^2 + \omega_m^2 Q_e^2}, \tag{10b}$$

$$E_{eq} = \omega_s X_m \sqrt{(\xi_M k_{p1} \omega_m^3 + k_{i1} x_1)^2 + i_{rq0}^{P\,2}}, \tag{10c}$$

$$\delta_{eq} = \theta_{PLL} - \tan^{-1}\left(\frac{\xi_M k_{p1} \omega_m^3 + k_{i1} x_1}{i_{rq0}^P}\right). \tag{10d}$$

and an equivalent rotor motion model $$\omega_{eq} = \frac{1}{\omega_N} \frac{d\delta_{eq}}{dt} + 1$$

$$= \frac{1}{\omega_N} \left( \frac{\partial \delta_{eq}}{\partial \theta_{PLL}} \frac{d\theta_{PLL}}{dt} + \frac{\partial \delta_{eq}}{\partial \omega_m} \frac{d\omega_m}{dt} + \frac{\partial \delta_{eq}}{\partial x_1} \frac{dx_1}{dt} \right) + 1$$

$$= \omega_{PLL} - \frac{3\xi_M k_{p1} \omega_m^2}{\omega_N \left( i_{rq0}^P + \frac{(\xi_M k_{p1} \omega_m^3 + k_{i1} x_1)^2}{i_{rq0}^P} \right)} \frac{d\omega_m}{dt} - \frac{k_{i1}}{\omega_N \left( i_{rq0}^P + \frac{(\xi_M k_{p1} \omega_m^3 + k_{i1} x_1)^2}{i_{rq0}^P} \right)} \frac{dx_1}{dt}.$$

$$\tag{12}$$

the equivalent rotor motion model (12) being in a nonlinear form;

wherein:

$$P_s^2 + Q_s^2 = S_s \times Conj[S_s] = (P_s + jQ_s)Conj[\hat{U}_s^{P*}]i_s^P \tag{6}$$

$$= U_s^* ((P_s i_{sd}^P - Q_s i_{sq}^P) + j(P_s i_{sq}^P + Q_s i_{sd}^P)),$$

where $S_s$, $P_s$, and $Q_s$ are complex power, active power, and reactive power of a DFIM stator; respective phase angle of a terminal voltage in a PLL phase angle reference frame is equal to 0, which means $U_s^P = U_s^* Conj[\cdot]$ represents a conjugate transposed;

where imaginary and real parts of the equation (6) are extracted as follows:

$$0 = \frac{U_s^*(P_s i_{sq}^P + Q_s i_{sd}^P)}{P_s^2 + Q_s^2}, 1 = \frac{U_s^*(P_s i_{sd}^P - Q_s i_{sq}^P)}{P_s^2 + Q_s^2}. \tag{7}$$

where:

$$-\omega_s X_m i_{rq0}^P = u_{sd}^P - \omega_s X_s i_{sq}^P + R_s i_{sd}^P - \frac{\omega_s X_m k_{p1} U_s^* P_e}{P_s^2 + Q_s^2}(P_s i_{sq}^P + Q_s i_{sd}^P), \tag{8a}$$

$$\omega_s X_m (\xi_M k_{p1} \omega_m^3 + k_{i1} x_1) = \tag{8b}$$

$$u_{sq}^P + \omega_s X_s i_{sd}^P + R_s i_{sq}^P + \frac{\omega_s X_m k_{p1} U_s^* P_e}{P_s^2 + Q_s^2}(P_s i_{sd}^P - Q_s i_{sq}^P).$$

and $$X_{eq} \approx X_{eq0} = \omega_s X_s + \frac{\omega_s \xi_M^2 X_m k_{p1} U_s^* v_0^5}{v_N \xi_M^2 v_0^4 + v_N^5 Q_{e0}^2},$$

where $v_N$ is the nominal wind speed;

linearizing the equivalent rotor motion model (12) to be an equivalent rotor motion model (16) in a linear form with respect to a steady-state operating point of the DFIG wind turbine $$\Delta\omega_{eq} = \frac{\partial \omega_{eq}}{\partial \omega_{PLL}}\bigg|_0 \Delta\omega_{PLL} + \frac{\partial \omega_{eq}}{\partial \omega_m}\bigg|_0 \Delta\omega_m + \frac{\partial \omega_{eq}}{\partial \frac{d\omega_m}{dt}}\bigg|_0 \frac{d\Delta\omega_m}{dt} + \tag{16}$$

$$\frac{\partial \omega_{eq}}{\partial x_1}\bigg|_0 \Delta x_1 + \frac{\partial \omega_{eq}}{\partial \frac{dx_1}{dt}}\bigg|_0 \frac{d\Delta x_1}{dt}$$

-continued $$= \Delta\omega_{PLL} + h_{D\omega} \frac{d\Delta\omega_m}{dt} + h_{Dx} \frac{d\Delta x_1}{dt},$$

where $\partial \omega_{eq}/\partial \omega_m|_0$ and $\partial \omega_{eq}/\partial x_1|_0$ equal to 0 considering $d\omega_m/dt$ and $dx_1/dt$ equal to 0 in a steady state;

wherein:

for a mechanical rotor motion, an electromagnetic torque $T_e$ should be:

$$T_e = -\frac{P_e}{\omega_m} = -P_s. \tag{13}$$

for an integral control of an active power control loop $P_e$ from s power calculation module is replaced by:

$$P_e = \omega_m P_s \tag{14}$$

for PLL, a phase angle $\theta_s$ of DFIG terminal voltage is reflected in an active power flow equation:

$$\theta_s = \delta_{eq} - \sin^{-1}\left(\frac{X_{eq0}}{E_{eq0}U_s^*}P_s\right), \quad (15)$$

Where $E_{eq0}$ be found in the equation (10c) and variables take their steady-state vlaues:

determining a first contribution of the DFIG wind turbines to a post-disturbance frequency of the power grid, in a center of inertia (COI) frequency frame by incorporating the simplified transient model of the DFIG wind turbine into a frequency dynamic analysis through $$\Delta\omega_{COI} = \frac{\sum_{\forall g}H_{G,g}S_{N,g}\Delta\omega_{G,g} + \sum_{\forall w}H_{eq,w}^{tol}S_{N,w}\Delta\omega_{eq,w}}{\sum_{\forall g}H_{G,g}S_{N,g} + \sum_{\forall w}H_{eq,w}^{tol}S_{N,w}}, \quad (21a)$$

$$H_{COI} = \frac{\sum_{\forall g}H_{G,g}S_{N,g} + \sum_{\forall w}H_{eq,w}^{tol}S_{N,w}}{\sum_{\forall g}S_{N,g} + \sum_{\forall w}S_{N,w}}; \quad (22b)$$

determining a second contribution of the DFIG wind turbines to the post-disturbance frequency of the power grid, in a frequency spatial variation frame by incorporating the simplified transient model of the DFIG wind turbine into the frequency dynamics analysis through $$SPC_{w,dist} = \frac{E_{eq0,w}U_{0,dist}}{X_{w,dist}}\cos(\delta_{eq0,w} - \theta_{0,dist}), \quad (25a)$$

$$\Delta P_{s,w} = \frac{SPC_{w,dist}}{\sum_{\forall g}SPC_{g,dist} + \sum_{\forall w}SPC_{w,dist}}\Delta P_{dist}; \text{ and} \quad (25b)$$

based on the first contribution and the second contribution, controlling the DFIG wind turbines to adjust an operating point using the PI controllers, to stabilize frequency of the power grid, wherein the operating point includes active power, reactive power, terminal voltage, and speed.

* * * * *